United States Patent
Kanba et al.

(10) Patent No.: US 6,575,081 B2
(45) Date of Patent: Jun. 10, 2003

(54) COFFEE MAKER

(75) Inventors: Takao Kanba, Kobe (JP); Terumi Torigai, Toyonaka (JP); Koji Kawai, Akashi (JP); Shigeru Yamaguchi, Kashiwara (JP); Masashi Kanbara, Akashi (JP); Hisashi Wada, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/964,844

(22) Filed: Sep. 28, 2001

(65) Prior Publication Data

US 2002/0035929 A1 Mar. 28, 2002

(30) Foreign Application Priority Data

Sep. 28, 2000 (JP) .......................................... 2000-296272
Jan. 16, 2001 (JP) .......................................... 2001-007347
Mar. 8, 2001 (JP) .......................................... 2001-064592
Mar. 8, 2001 (JP) .......................................... 2001-064593

(51) Int. Cl.[7] ............................................. A47J 31/057
(52) U.S. Cl. ............................... 99/299; 99/306; 99/307
(58) Field of Search .......................... 99/299, 283, 305, 99/306, 307

(56) References Cited

U.S. PATENT DOCUMENTS 4,819,553 A * 4/1989 Heyn et al. ............... 99/209 X

FOREIGN PATENT DOCUMENTS

| JP | 58-143722 | 8/1983 |
| JP | 59-073232 | 5/1984 |
| JP | 06-284971 | 10/1994 |

* cited by examiner

Primary Examiner—Reginald L. Alexander
(74) Attorney, Agent, or Firm—McDermott, Will & Emery

(57) ABSTRACT

A coffee maker is provided in which remaining water can be taken out easily, hot water is delivered intermittently to brew nice coffee. A hot water reservoir in the coffee maker has a tube provided on a bottom thereof for delivering the hot water to a coffee brewing chamber and a cap arranged with a space from the tube by a distance which is not greater than the maximum inner diameter of the tube.

17 Claims, 30 Drawing Sheets

COFFEE MAKER

FIELD OF THE INVENTION

The present invention relates to a coffee maker for forcing a stream of hot water from a hot water boiler through ground coffee beans to brew a pot of coffee.

BACKGROUND OF THE INVENTION

For brewing a pot of rich-flavor or tasty coffee, a spoonful of ground coffee beans are steamed and expanded by hot water for ease of brewing and then soaked intermittently with flows of hot water. Such coffee makers having a function of steaming and a function of supplying intermittent flows of hot water at a lower cost are disclosed in Japanese Patent Laid-open Nos. 58-143722 and 6-284971. Those conventional coffee makers are equipped with a hot water reservoir for intermittently feeding a coffee brewing chamber with hot water by the action of siphoning.

However, the siphoning action in such a conventional maker may be interrupted during the brewing of coffee due to an increase of the inner pressure in the hot water reservoir, an unstable exchange of the internal air with fresh air at the siphon system, a resistance in the flow of air at the air-intake, and a dislocation of the supply of hot water from the hot water boiler. Thus, the siphoning cannot easily be carried out at given intervals of time. When the hot water is supplied continuously, it can rarely brew a pot of tasty coffee.

More specifically, as shown in FIG. 29, the intermittent siphoning action largely depends on the intaking of air from a hot water spout 2 into a hot water reservoir 1 when the stored hot water has been released from the reservoir 1. This action requires a space 4 between the bottom of the hot water reservoir 1 and the siphon system 3 for exchanging the air. Accordingly, a pool of water may remain in the space 4 at the bottom of the hot water reservoir 1 as being not affected by the siphoning action. Also, a remaining steam generated by a hot water boiler 5 may be cooled and condensed to water after the brewing and stay in the hot water reservoir 1.

For solving the above described drawbacks, a modification of the coffee maker is disclosed in Japanese Utility-model Laid-open No. 59-73232, which discloses that a valve in the bottom of the hot water reservoir for drainage. It however has a complicated construction and permits a coffee brewing section to be dismounted/mounted with much difficulty.

When hot water is supplied from the hot water boiler 5 to the hot water reservoir 1 in a fast manner, it may interrupt the exchange of air between the hot water reservoir 1 and the siphon system 3 at a hot water receiver 8 in a dripping unit 7 above the coffee brewing chamber 6. As a result, the balance between the supply of hot water from the hot water boiler 5 and the transfer of hot water from the hot water reservoir 1 to the hot water receiver 8 is fractured. That hence causes the hot water to be supplied continuously but not intermittently.

For brewing a pot of coffee while stably carrying out the siphoning action, the maker needs to have an air vent 9 in the top of the hot water reservoir 1 which inhibits the inner pressure from excessively increasing in the hot water reservoir 1. As the hot water reservoir 1 is nearly filled up with hot water, the air vent 9 permits a jet of steam or hot water itself to blow out from the reservoir.

Alternatively, in another conventional coffee maker with a heater 12 an increased output for shortening the brewing period or elevating the brewing temperature, as shown in FIG. 30, the temperature of the heater 12 may soar up as a water tank 11 becomes nearly exhausted or feeds a less flow of water. Accordingly, the water is more evaporated than boiled and finally escapes in the form of steam from a dripping spout 14.

When the tank 11 becomes completely empty, and when the heater 12 and a water feed system including a pump-up pipe 13 are heated up, the temperature of remaining water in the coffee maker increases so as to evaporate it. This causes the temperature of the heater 12 to increase for a while even when the electricity is disconnected by a thermostat 15 or the like. The greater the output of the heater 12, the higher the temperature remains. In particular, the temperature of a connector tube 16 for connecting between the heater 12 and the pump-up pipe 13 becomes very high. A selection of the material of the connector tube 16 is limited in view of the heat resistance.

Under a low ambient temperature, the temperature of the hot water passes through cool ground coffee beans and is dripped into a glass decanter 17 at which the temperature is also low. Thus, the temperature of the water may decline. For increasing the temperature of brewed coffee, the glass decanter 17 filled with the brewed coffee has to be heated with a keep-warm plate 18. This requires the heater 2 to lower its output, thus extending the brewing time. As the hot water runs slowly through the ground coffee beans, resultant brewed coffee becomes strong.

When all the water stored in the tank 11 has been dripped from the dripping spout 14 into a basket 19 filled with the ground coffee beans, the heater 12 is turned off, and a notifying section releases a notice of the end of the brewing action. As the basket 19 slowly delivers the brewed coffee, the notice will be released on the way of the brewing.

SUMMARY OF THE INVENTION

A coffee maker capable of removing remaining water from a hot water reservoir after the coffee brewing action and delivering the hot water intermittently to a coffee brewing chamber where it is scattered over ground coffee beans is provided to brew tasty flavor coffee using a simple arrangement.

Another coffee maker is also provided. The maker has an air vent for inhibiting the inner pressure in the hot water reservoir from increasing excessively, whereby hot water or steam hardly leaks or splashes out from the hot water reservoir during service.

While the temperature of a heating device for generating hot water and a water feed system is controlled to stay not very high, the output of the heating device is optimized for brewing coffee. The resultant brewed coffee has improved flavor and taste and is kept favorably hot.

A coffee maker includes a hot water reservoir having a hot water reservoir bottom (referred to as a reservoir bottom hereinafter) and a hot water reservoir enclosure (referred to as a reservoir enclosure hereinafter). The maker further includes a tube for delivering hot water to a coffee brewing chamber in the reservoir bottom, and a cap disposed over and spaced from the tube by a specific distance. The distance between the cap and the tube is not greater than the maximum inner diameter of an opening of the tube to develop a siphoning effect for delivering the hot water intermittently to the coffee brewing chamber. This allows the hot water and the air to flow alternately above the opening of the tube, hence making the intermittent hot water delivering action stable.

A further coffee maker includes a hot water reservoir for storing hot water, an intermittent hot water delivering section for delivering the hot water intermittently from an outlet of the hot water reservoir to the outside, and a water treating unit mounted detachably to the hot water reservoir for purifying the hot water received from the outlet. The hot water reservoir has a bottom opening provided at the bottom thereof. The water treating unit is equipped with a lid. When the water treating unit is installed from below to the hot water reservoir, the lid shuts the bottom opening of the hot water reservoir. As the bottom opening closes with the lid on the water treating unit, the intermittent hot water delivering action is hardly interrupted. Once the water treating unit is dismounted, the bottom opening opens widely. Accordingly, while remaining water in the water treating unit is removed, the hot water reservoir is simultaneously drained from the bottom opening.

A still further coffee maker includes a hot water reservoir having an intermittent hot water delivering section for delivering hot water not intermittently to a coffee brewing chamber. The hot water reservoir has an air vent thereof extending downwardly of the hot water reservoir. This inhibits hot water or steam from leaking and splashing out from the hot water reservoir in upper and side directions after the hot water is completed to supply to the hot water reservoir.

A still further coffee maker includes a heating device for heating up water received from a water tank, a heater controller for controlling the heating device, and a temperature sensor for detecting the temperature of the heating device or the water feed system. When the temperature measured by the temperature sensor increases to a first setting degree during the coffee brewing action, the heater controller declines the output of the heating device and continues to energize the device. When the water is nearly exhausted, and when the temperature of the heating device soars up at the end of the brewing action to change the hot water into steam, the output of the heating device declines. As a result, the release of steam is reduced. The output of the heating device during the brewing action is favorably controlled to an optimum level for brewing coffee.

DETAILED DESCRIPTION OF THE PREFERRED EMBODIMENTS

Embodiments of the present invention will be described referring to FIG. 1 through FIG. 28.

(Embodiment 1)

Figure 1:
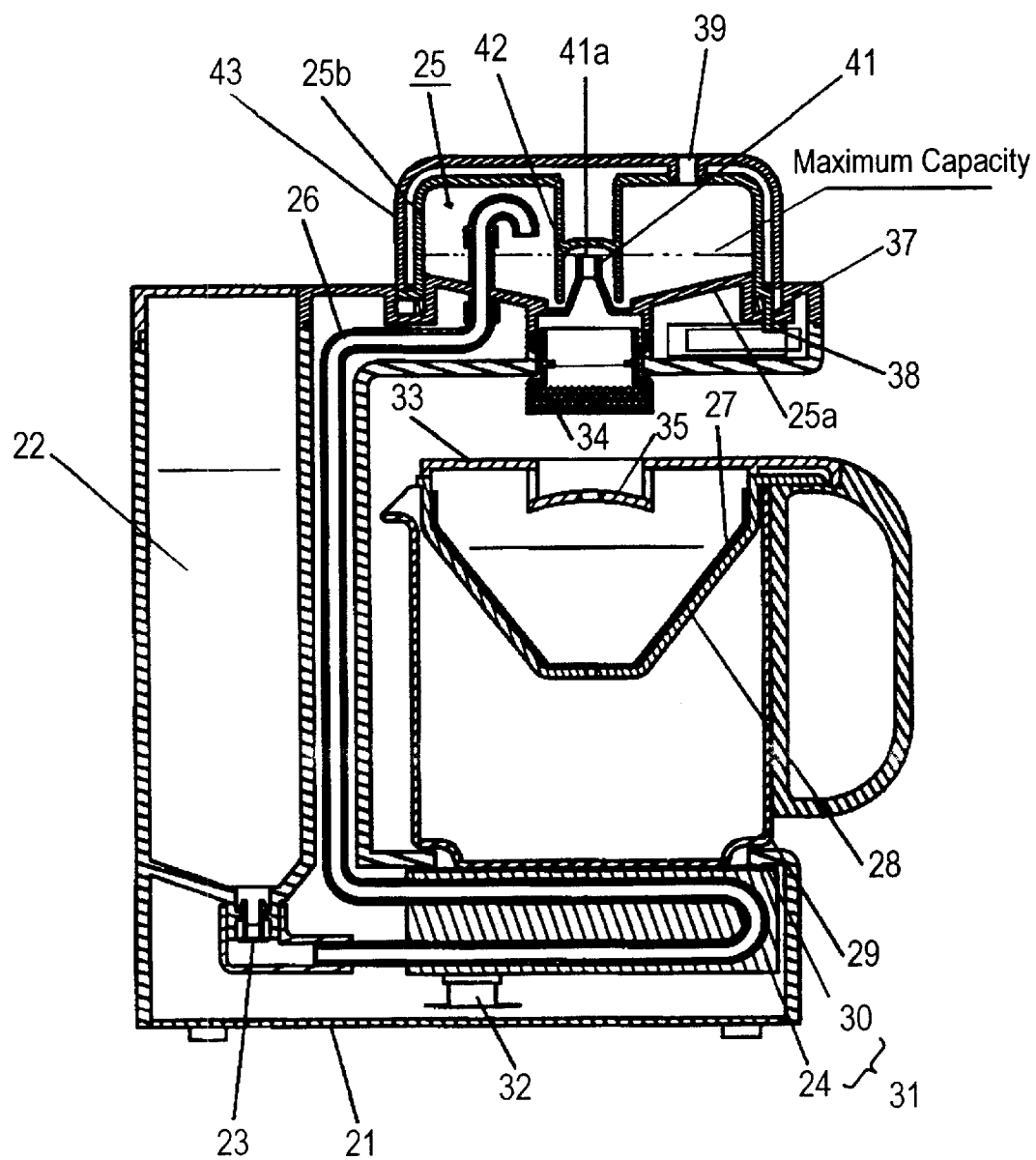
FIG. 1 is a cross sectional view of a coffee maker according to Embodiment 1 of the present invention.
Figure 5:
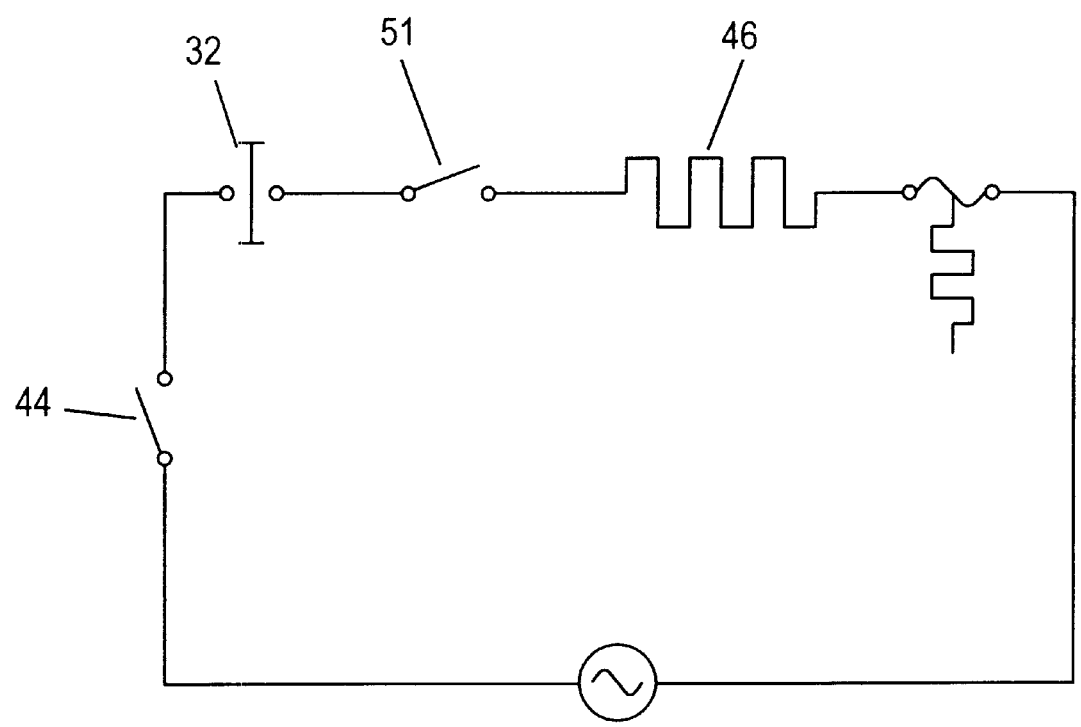
FIG. 5 is a circuit diagram of the coffee maker of Embodiment 1.

FIG. 1 is a cross sectional view of a coffee maker according to Embodiment 1 of the present invention. In FIG. 1, a main housing 21 of the coffee maker includes a water tank 22 storing water. The tank 22 is communicated at the bottom thereof via a check valve 23 to a hot water boiler 24 equipped with an electric heater 46 (See FIG. 5) which is turned on and off with a power switch 44 (FIG. 5). The hot water boiler 24 is communicated with a conduit 26 for introducing water to a hot water reservoir 25 located at the top. Beneath the hot water reservoir 25, a container 29 is provided for receiving brewed coffee. A paper filter 27 and a coffee brewing chamber 28 having substantially an analogous shape to the filter are provided at the opening of the container 29.

The container 29 is placed on a keep-warm base 31 including a keep-warm plate 30 located above the hot water boiler 24 in the main housing 21. After the brewing action is completed, the electric heater 46 of the hot water boiler 24 is controllably energized with a thermostat 32 to warm up the keep-warm base 31 and the brewed coffee received in the container 29 as shown in the circuitry diagram of FIG. 5.

A coffee brewing chamber lid 33 is provided on the container 29. The coffee brewing chamber lid 33 has a spreader 35 for spreading hot water supplied from the hot water reservoir 25, filtered by a water treating filter 34 such as active carbon, and received by the coffee brewing chamber 28.

Figure 2:
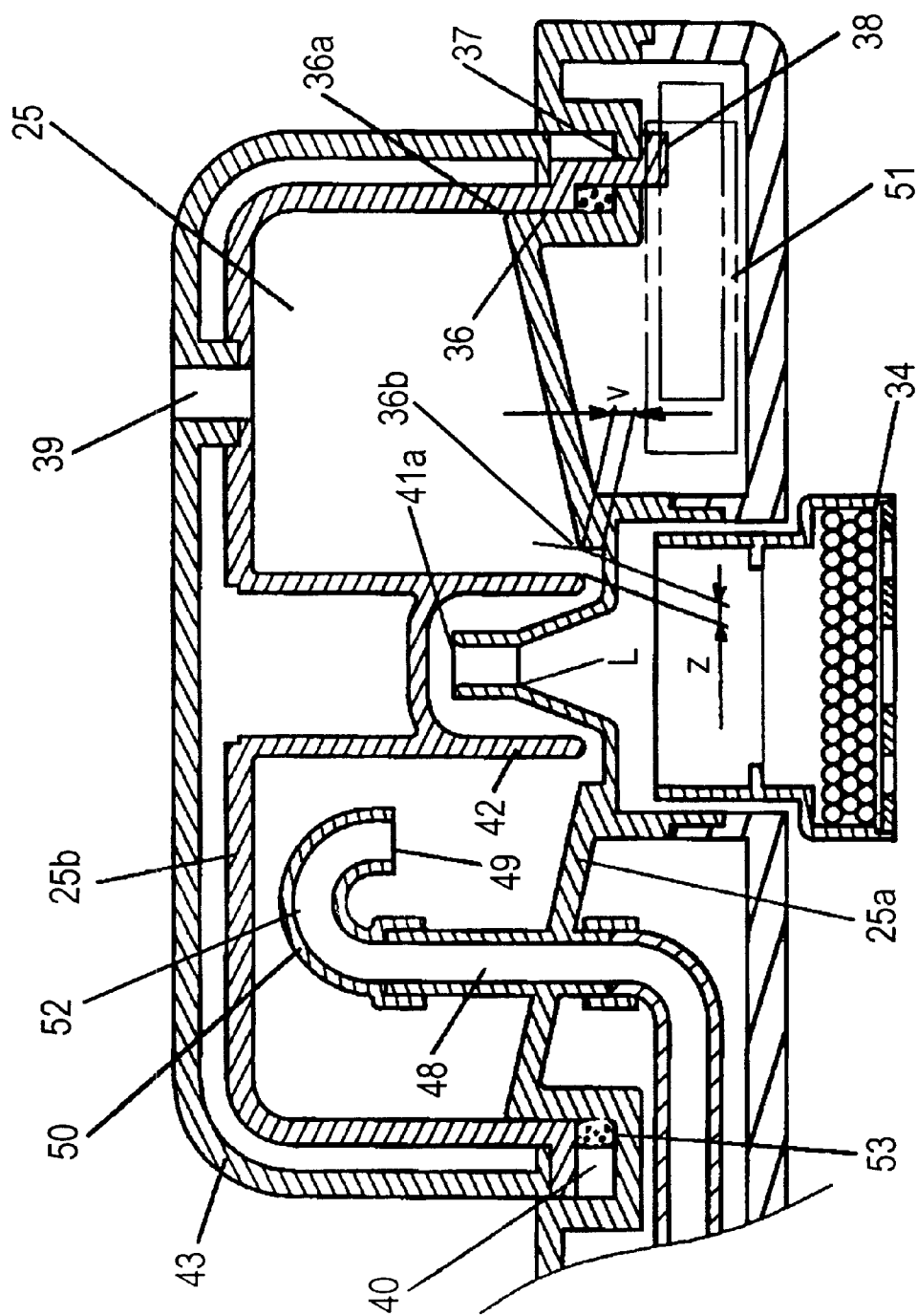
FIG. 2 is a detailed cross sectional view of a hot water reservoir in the coffee maker of Embodiment 1.

FIG. 2 is a detailed cross sectional view of the hot water reservoir in Embodiment 1. The hot water reservoir 25 comprises a hot water reservoir bottom 25a (referred to as a reservoir bottom hereinafter) a hot water reservoir enclosure 25b (referred to as a reservoir enclosure), and an elastic member 53 provided between them. The elastic member 53 is securely positioned by an outer wall 36 of the reservoir bottom 25a.

Figure 3:
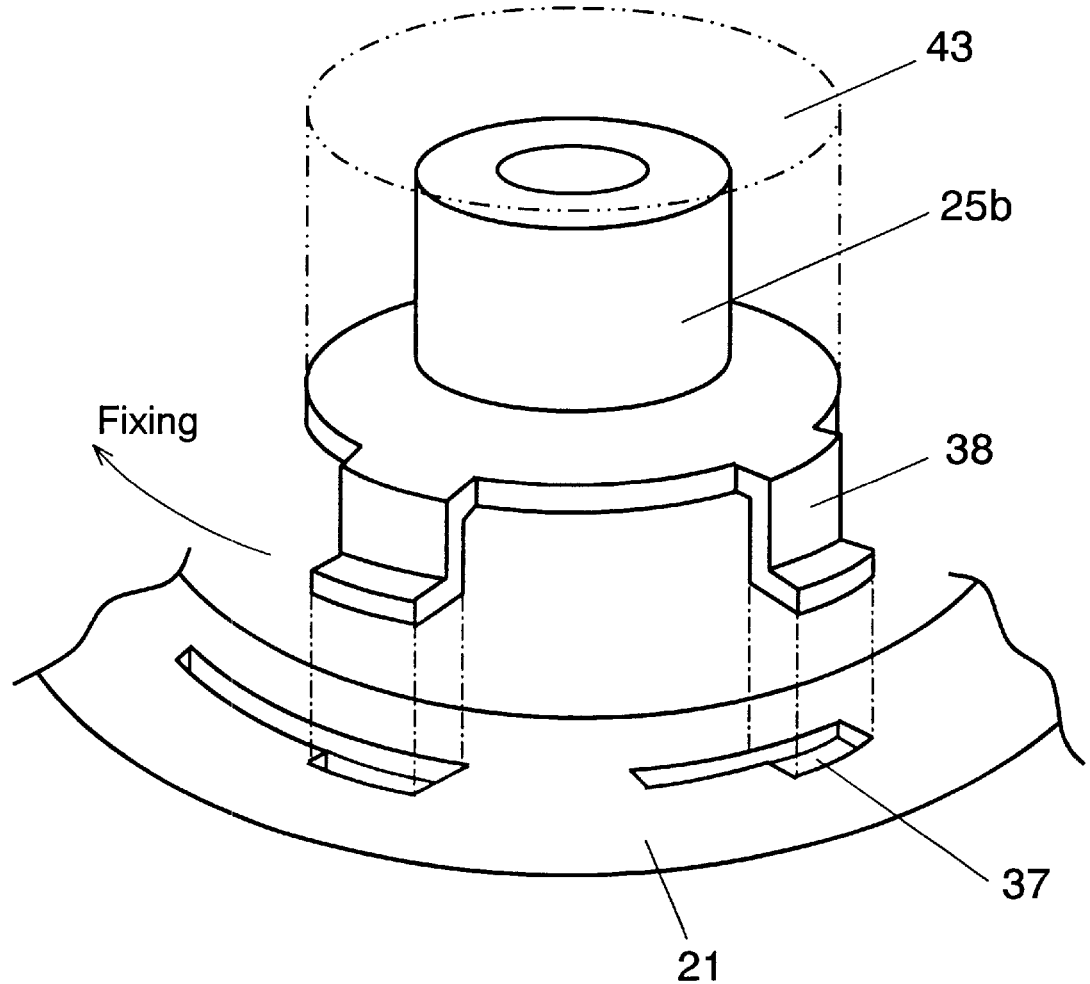
FIG. 3 is a perspective view showing the fitting relationship between the hot water reservoir and a main housing of Embodiment 1.

As shown in FIG. 3, for maintaining the air tightness in the hot water reservoir 25, the reservoir enclosure 25b is closely fitted into the main housing 21 with three fingers 38 provided on the outer side of the reservoir enclosure 25b, inserted into corresponding holding apertures 37 provided in the main housing 21, and turned clockwise as seen from the above to press and deform the elastic member 53. An air vent 39 is also provided for inhibiting the inner pressure in the hot water reservoir 25 from increasing up to 1.2 times the atmospheric pressure.

As shown in FIG. 2, a microswitch 51 is mounted near a hot water reservoir mount 40 on the main housing 21. The microswitch 51 determines from its contact closed by the finger 38 that the hot water reservoir 25 is turned clockwise and has an enclosure 25b placed at its own location.

Figure 4:
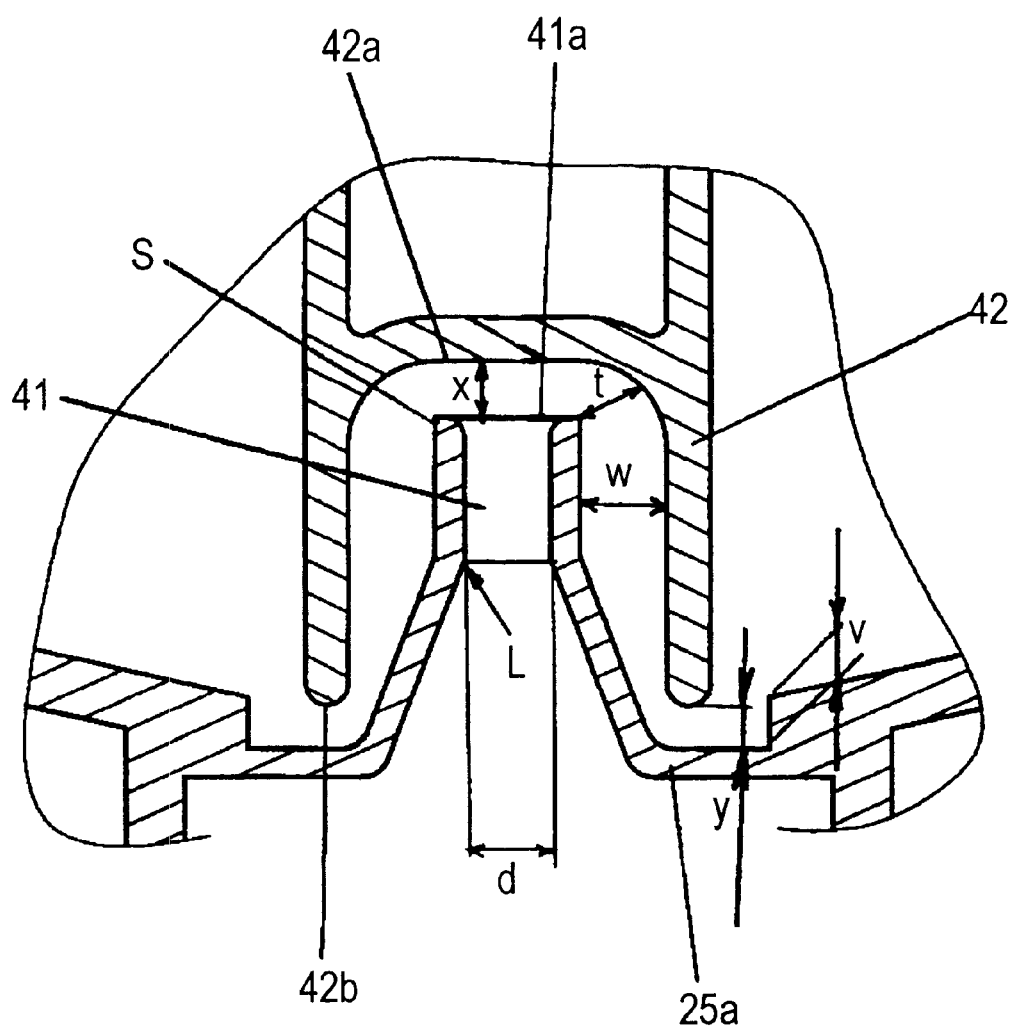
FIG. 4 is an enlarged cross sectional view of a primary part of a tube and a cap in the hot water reservoir of Embodiment 1.

Referring to FIG. 4, a tube 41 having substantially a cylindrical shape for delivering hot water to the coffee brewing chamber 28 according to the present invention is mounted vertically on the center of the reservoir bottom 25a which is substantially aligned with the center of pivotal movement of the reservoir enclosure 25b. A bottomed cap 42 extending from the reservoir enclosure 25b is provided above and spaced by a distance from the tube 41. It is determined that the distance x between the upper end 41a of the tube 41 and the bottom 42a of the cap 42 is not greater than the maximum inner diameter d (referred to as the inner diameter d hereinafter) of the upper end 41a of the tube 41. Also, the distance y between the lower end 42b of the cap 42 and the reservoir bottom 25a (at the base of the tube 41) is equal to or greater than the distance x.

The reservoir bottom 25a is sloped down from the peak 36a of the outer wall 36 to the lowest end 36b which is spaced from the lower end 42b of the cap 42 by a distance z greater than the distance y, as shown in FIG. 2. In case that the lowest end 36b of the tilted reservoir bottom 25a is stepped, the height of step v is preferably smaller than the distance y.

For ensuring the effect of siphoning action, the distances need to satisfy the following relationship:

Inner diameter d≧Distance y≧Distance x;

Distance z≧Distance y; and

Distance y≧Distance v.

The cap 42 arranged of the bottomed cylindrical shape is coaxial with the tube 41. As shown in FIG. 4, a bottom 42a of the cap 42 has the curved wall having a radius greater than a distance w between these cylinders. Thus, an upper space at the distance x and a side space at the distance w are communicated to each other with an interface space. In the interface space, the distance t between the upper end S (at the upper corner) of the tube 41 and the curved wall of the bottom 42a of the cap 42 gradually varies. The lower end 42b of the cap 42 is rounded at its edge as having a semi-circular curve in this embodiment while the reservoir bottom 25a provides no linear portion. The reservoir enclosure 25b is protected entirely at the outer side with a (reservoir) cover 43.

The tube 41 has an inner diameter gradually increase from an intermediate to a lowermost end, i.e., to the coffee brewing chamber 28, as shown in FIG. 2. The distance from the intermediate L to the lowermost end of the tube 41 is preferably longer than the inner diameter d.

A hot water supply pipe 48 shown in FIG. 2 is connected to the water conduit 26 and may be formed unitarily with the reservoir bottom 25a. The distal end of the hot water supply pipe 48 is connected with a discharge pipe 50 having a discharge outlet 49 opening downwardly. The peak 52 of the discharge pipe 50 is higher than the upper end 41a of the tube 41.

An operation of the coffee maker of this embodiment having the above described arrangement will be described.

The water tank 22 is filled with desired cups of fresh water, and a corresponding quantity of ground coffee beans are fed in the paper filter 27 set in the coffee brewing chamber 28, which is then placed on the keep-warm base 31. As the power switch 44 (FIG. 5) is turned on, the water runs from the tank 22 via the check valve 23 to the hot water boiler 24, where the water is heated up and turned to hot water. Simultaneously, air bubbles generated by the heating runs upwardly through the conduit 26 by the non-return action of the check valve 23 thus to pump up the hot water from the hot water boiler 24 to the hot water reservoir 25.

The hot water is received by the hot water reservoir 25 while running from the downwardly opening discharge outlet 49 of the hot water supply pipe 48 without coming into direct contact with the upper side of the reservoir enclosure 25b. This can inhibit the temperature of the hot water from declining. Also, the cover 43 protecting entirely the hot water reservoir 25 creates a thermally insulating layer of air, hence preventing heat out of the hot water reservoir 25 from being radiated and eliminating the loss of heat due to ambient air.

Figure 6:
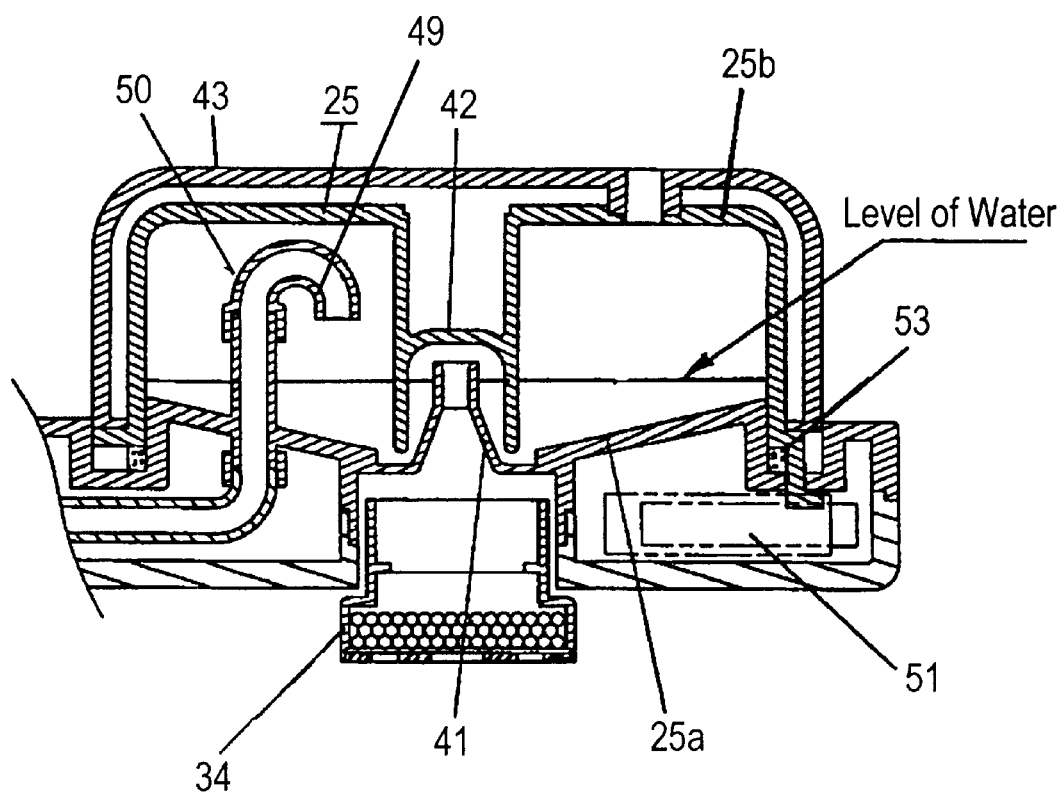
FIG. 6 is a cross sectional view showing the hot water reservoir being filled with hot water in Embodiment 1.
Figure 7:
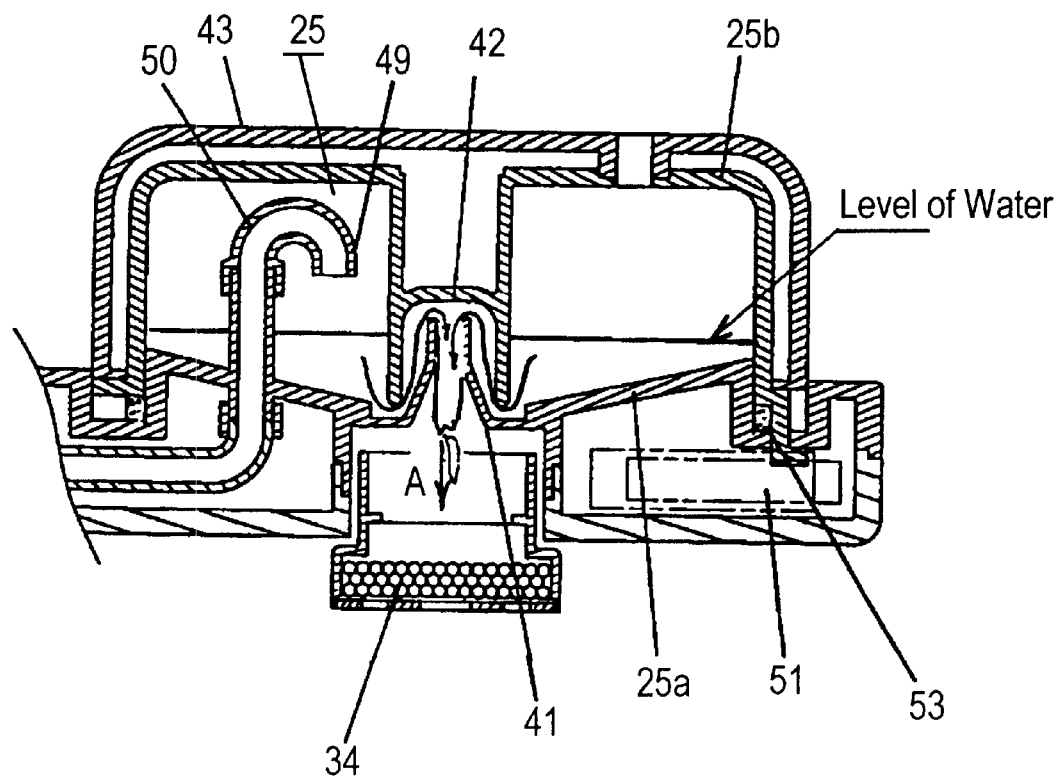
FIG. 7 is a cross sectional view showing the hot water reservoir being exhausted in Embodiment 1.

With the hot water received by the hot water reservoir 25, the interior space between the tube 41 and the cap 42 is filled up, as shown in FIG. 6. When the hot water exceeds the upper end (peak) 41a of the tube 41 which is close to the maximum storage capacity of the hot water reservoir 25, the hot water runs downwardly by the siphoning action from the hot water reservoir 25 to the tube 41 in a direction denoted by the arrow A (shown in FIG. 7) and received by the water treating filter 34.

Figure 8:
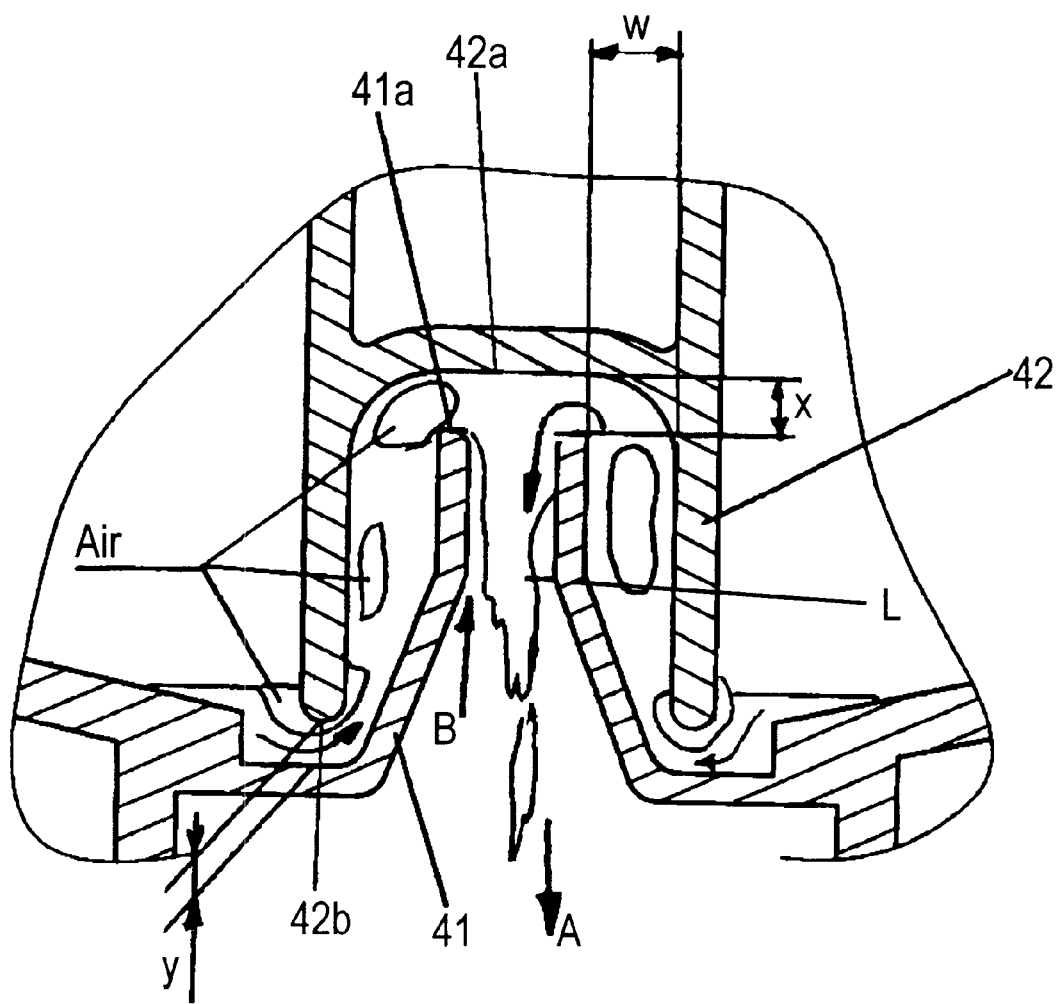
FIG. 8 is a cross sectional view of a primary part of the hot water reservoir delivering the hot water at intervals in Embodiment 1.
Figure 9:
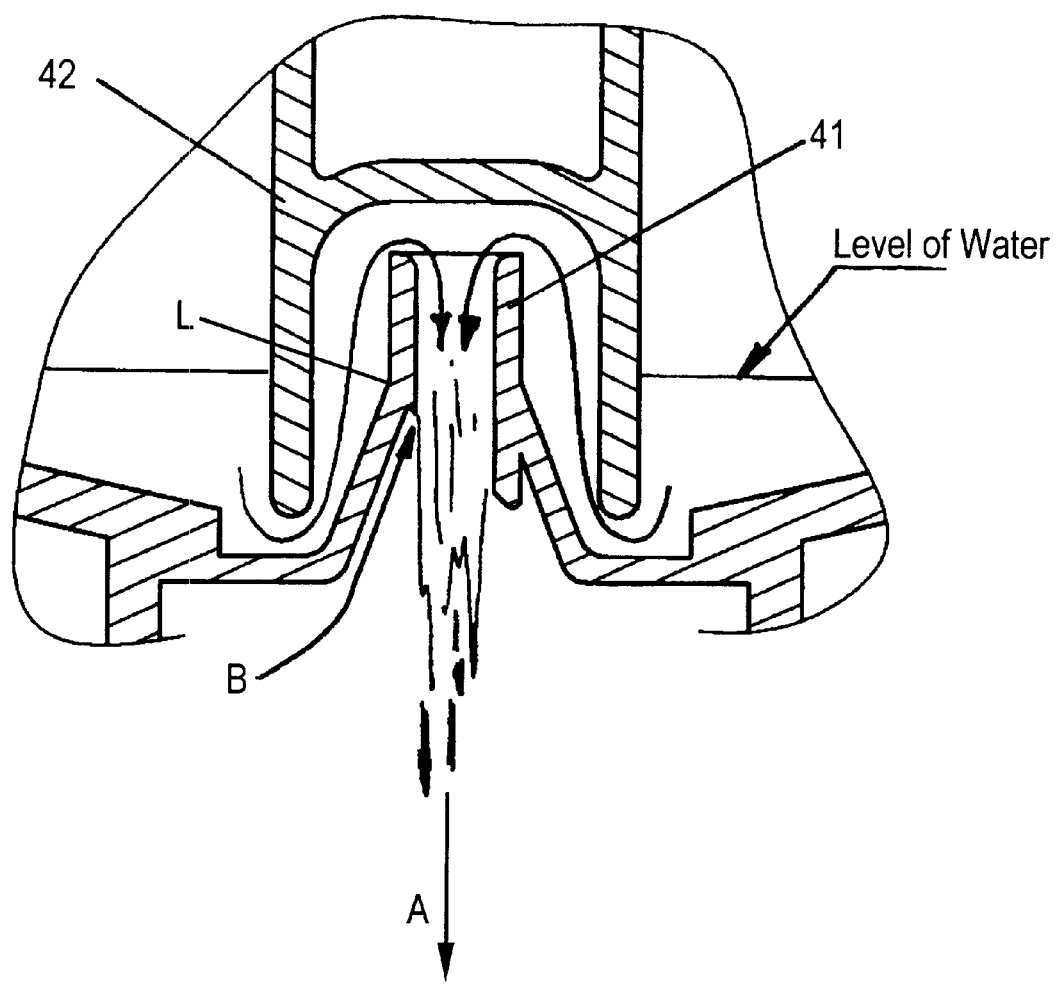
FIG. 9 is an enlarged cross sectional view showing a modification of the tube in the hot water reservoir of Embodiment 1.

The siphoning action causes the hot water to run out of the hot water reservoir 25 faster than that running into the reservoir 25. As shown in FIG. 8, The distance y between the lowest end of the cap 42 and the tube 41 is greater than the distance x between the upper end of the tube 41 and the cap 42. The space between the cap 42 and the upper edge 41a of the tube 41 is not uniform. Therefore, the air is introduced from two directions, one from together with the hot water from the hot water reservoir 25 through the space of the distance y at the cap 42 and another from the tube 41 in a direction denoted by B. The air forms a pocket of air in the space of the distance x. The pocket interrupts the continuous flow of the hot water driven by the siphoning action at the space of the distance X above the tube 41.

The hot water flows along the tube 41 carries the air up to the intermediate location L where the cross section starts increasing, so that the air is hardly delayed to introduce in the direction B. This effect may be achieved by the lower end on the coffee brewing bracket 28 side of the tube 41 cut at an angle, as the shape of the cap 42 shown in FIG. 9.

The tube having the upper end 41a rounded or beveled at the inner side separates the flow of the hot water.

The hot water received by the water treating filter 34 is scattered by the spreader 35 of the coffee brewing chamber lid 33 and penetrated uniformly into the ground coffee beans in the coffee brewing chamber 28. A siphoning action is triggered upon the hot water in the hot water reservoir 25 reaching the upper end 41a of the tube 41 (close to the maximum storage capacity of the hot water reservoir 25). The siphoning action feeds the hot water to the coffee brewing chamber 28 intermittently. This allows the ground coffee beans in the coffee brewing chamber 28 to be deeply steamed with the water and allows coffee flavor to be extracted easily. In addition, just filling the hot water reservoir 25 with the hot water to the maximum storage capacity supplies the hot water for the second time or more. Therefore, with the ground coffee beans being stirred gently in the coffee brewing chamber 28, a desired amount of the brewed coffee is received by the container 29.

Even after the water tank 22 gets empty, the hot water boiler 24 remains activated until the thermostat 32 operates. At this time, the steam runs via the conduit 26 to the hot water reservoir 25, where the inner pressure rises.

The lower end 42b of the cap 42 located above the tube 41 has the inner and outer sides thereof arranged with a curved configuration (FIG. 4). Therefore, the hot water is introduced into the cap 42 with less physical resistance and can flow smoothly through the cap 42 before running out of the tube 41. Accordingly, the remaining hot water in the hot water reservoir 25 is significantly reduced. When the thermostat 32 operates, the electric heater 46 is temporarily cancelled to energize. The thermostat 32 operating automatically can keep the container 29 placed on the keep-warm base 31 to be warm. The keep-warm action continues until the power switch 44 is turned off.

When the power switch 44 is turned off, and when the temperature of the hot water reservoir 25 drops down, condensed water appears in the hot water reservoir 25. For removing the condensed water, according to this embodiment, the reservoir enclosure 25b is allowed to be turned counter-clockwise and has fingers 38 pulled out of corresponding apertures 37 to be removed from the main housing 21. Then, As the reservoir bottom 25a slopes, the condensed water flows down around the tube 41 and can thus be taken away easily. The elastic member 53 which is limited to position between the outer wall 36 of the reservoir bottom 25a and the reservoir enclosure 25b ensures the air tightness between the reservoir bottom 25a and the reservoir enclosure 25b. While the reservoir enclosure 25b is dismounted for a removal of the condensed water, the microswitch 51 detects the absence of the reservoir enclosure 25b and thus opens the control circuit. Therefore, even if the power switch 44 is accidentally turned on, the electric heater 46 is left inactivated, hence permitting the hot water or steam not to leak from the coffee maker.

Figure 10:
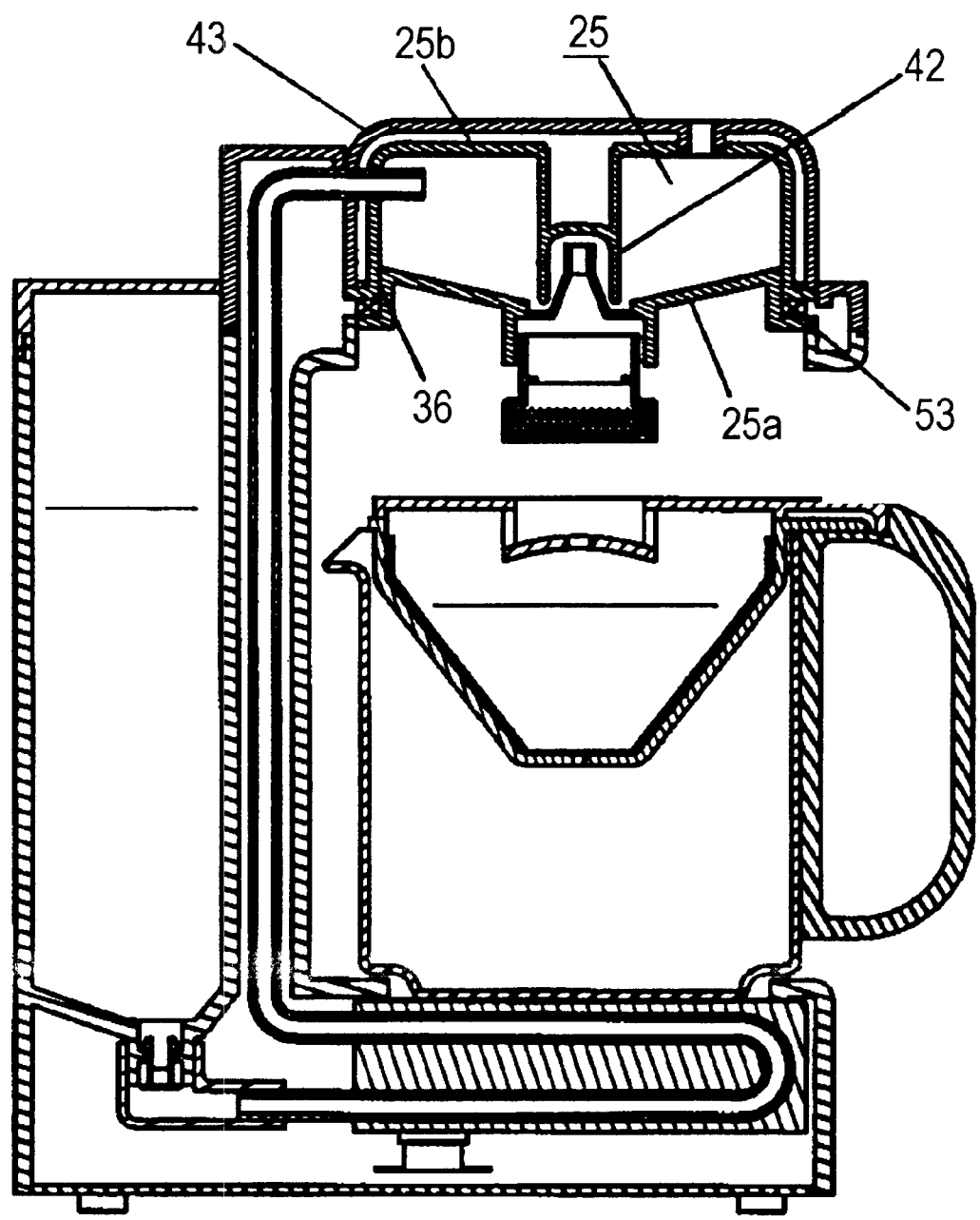
FIG. 10 is a cross sectional view of a modification of the coffee maker of Embodiment 1.

In the hot water reservoir 25 of this embodiment, the reservoir enclosure 25b is dismounted while the reservoir bottom 25a remaining mounted to the main housing 21. The hot water reservoir 25 may alternatively have a reservoir enclosure 25 b thereof fixed to the main housing and a detachable reservoir bottom 25a thereof provided with a wall 36 for determining the position of an elastic member 53, as shown in FIG. 10. This modification exhibits the same effect.

(Embodiment 2)

Figure 11:
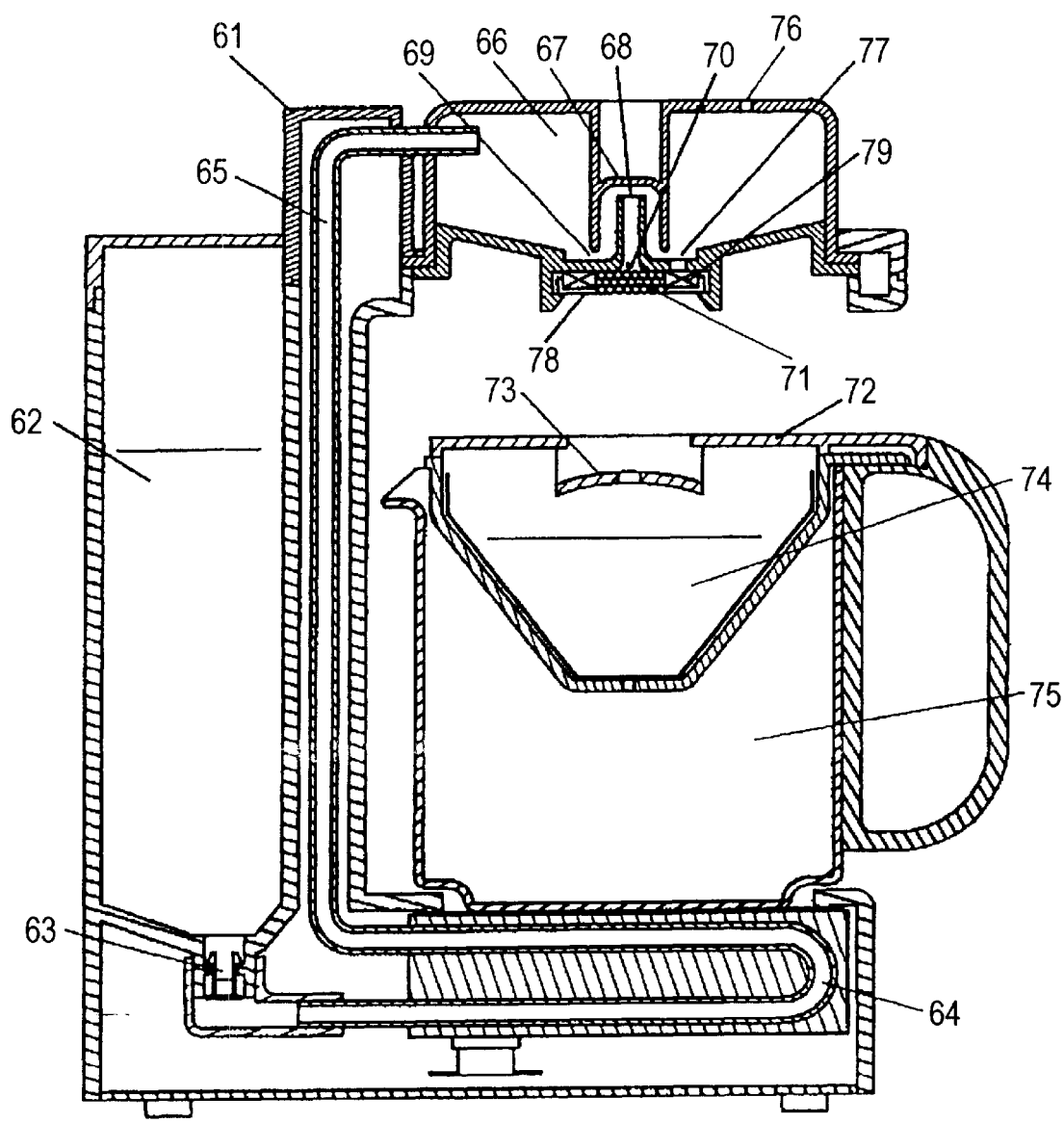
FIG. 11 is a cross sectional view of a coffee maker according to Embodiment 2 of the present invention.

FIG. 11 is a cross sectional view of a coffee maker according to Embodiment 2 of the present invention. A main housing 61, a water tank 62, a check valve 63, a hot water boiler 64, a hot water conduit 65, and a hot water reservoir 66 are identical to those of Embodiment 1 and will be described in no more detail.

A siphon system 67 includes a tube 68 provided vertically above a hot water outlet 70 and a passage having a distance 69 between the upper opening end of the tube 68 and the bottom of the hot water reservoir 66. This allows a siphoning action to be intermittently performed by the hot water flowing from the passage at the distance 69 via the outlet 70 to the outside while the air running into the hot water reservoir 66. The hot water outlet 70 for discharging an amount of hot water from the hot water reservoir 66 to the outside is located at the lowest position of the hot water reservoir 66. Beneath the hot water outlet 70, a water treating unit 71 having active carbons, a spreader 73 on a coffee brewing chamber lid 72, and a coffee brewing chamber 74 are disposed. Coffee brewed at the coffee brewing chamber 74 is received and stored in a container 75. The hot water reservoir 66 has an air vent 76 provided in the upper side thereof for releasing steam to inhibit the inner pressure in the hot water reservoir 66 from increasing excessively.

The hot water reservoir 66 also has a bottom opening 77 provided in the bottom thereof. The water treating unit 71 is accompanied together with a detachable lid 78 and an elastic member 79. As the detachable lid 78 is mounted from below the bottom of the hot water reservoir 66, the elastic member 79 shuts off the bottom opening 77 of the hot water reservoir 66.

The action of the coffee maker of Embodiment 2 having the above described arrangement will be explained. Similar to Embodiment 1, the hot water generated by the hot water boiler 64 runs upwardly by a steam pressure through the hot water conduit 65 and received and stored in the hot water reservoir 66. The siphon system 67 includes an inverted U-shaped tube or a cap and a tube 68 causes the hot water exceeding a particular level to rush out of the hot water reservoir 66 due to the siphoning action. The hot water then runs through the water treating unit 71 having active carbon and is scattered from the spreader 73 of the coffee brewing chamber lid 72 over the coffee brewing chamber 74. The brewed coffee is received and stored in the container 75.

The action of the hot water in the hot water reservoir 66 will be explained in more detail.

The distance 69 is provided between the bottom of the hot water reservoir 66 and the siphon system 67. The hot water in the hot water reservoir 66 runs from the passage at the distance 69 to the tube 68 and exits from the hot water outlet 70. Soon after this, the outside air flows from the hot water outlet 70 via the tube 68 and the passage at the distance 69 into the hot water reservoir 66. Then, the intermittent supply of hot water is completed. However, the distance 69 permits a portion of the hot water, which is not affected with the siphoning action, to remain in the hot water reservoir 66. In addition to such a remaining portion of the hot water, steam generated in both the hot water boiler 64 and the hot water reservoir 66 is cooled down along the inner wall of the hot water reservoir 66 after the brewing action and is turned to a pool of water.

The remaining portions of water in the reservoir 66 and water treating unit 71 can easily be taken away with the water treating unit 71 having the lid 78 mounted at the bottom opening 77 being removed. When the water treating unit 71 is mounted back to the hot water reservoir 66, the elastic member 79 securely attaches on the lid 78 to shut off the bottom opening 77 hence allowing the intermittent action of hot water supply due to the siphoning effect. The elastic member 79 mounted to the lid 78 improves the air tightness. An elastic member may be provided about the hot water outlet 70. The lid 78 itself may be elastic. If the air tightness is not very critical, the elastic member may be omitted or replaced by a protruding rib provided on the lid 78.

In Embodiment 2, the siphon system 67 including the tube 68 is used as an intermittent hot water supplying section for intermittently feeding the hot water in the hot water reservoir 66 from the hot water outlet 70. The siphon system may be replaced by any other intermittent supply section such as a pump. As long as the hot water outlet is provided in any other location than the bottom of the hot water reservoir 66 to allow a portion of the hot water to remain in the bottom, the system exhibits the same effect.

(Embodiment 3)

Figure 12:
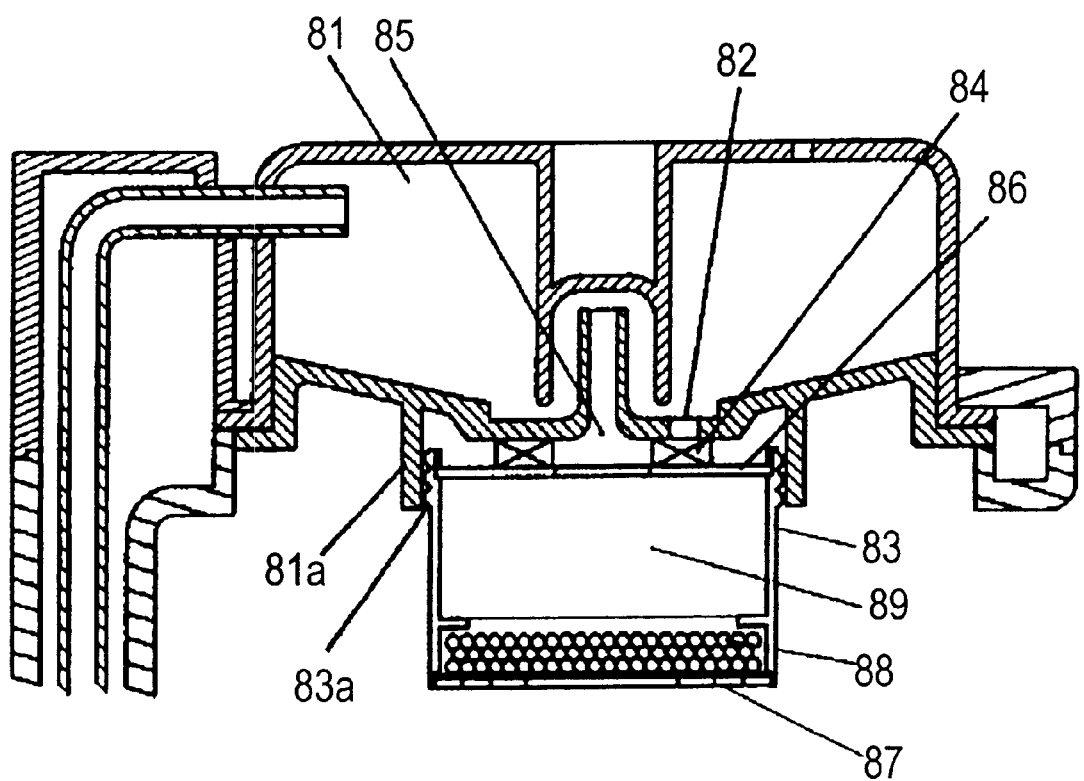
FIG. 12 is a cross sectional view of a primary part of a coffee maker according to Embodiment 3 of the present invention.

FIG. 12 is a cross sectional view of a primary part of a coffee maker according to Embodiment 3 of the present invention.

In this embodiment, a hot water reservoir 81 has a bottom hole 82 provided in the bottom thereof and a female thread 81*a* thereof provided beneath the bottom. A spreader 83 has a male thread 83*a* and an elastic member 84 mounted to the top of the spreader 83 through a lid 86 having a hole at the center thereof. The hole is formed for not interrupting the supply of hot water from a hot water outlet 85. The spreader 83 has a perforated spreading plate 87 mounted in the bottom thereof. A water treating unit 88 including active carbons is mounted on the spreading plate 87. The spreader 83 also has a hot water receiver 89 provided therein for temporarily storing the hot water before drips of the hot water are effectively scattered at proper speed in a possible area over the ground coffee beans. The hot water receiver 89 provides a volumetric space greater than the volume of each intermittent supply of the hot water from the hot water reservoir 81. As the spreader 83 is screwed and mounted to the hot water reservoir 81, the elastic member 84 presses the bottom of the hot water reservoir 81 and shut off the bottom opening 82.

As the bottom opening 82 of the hot water reservoir 81 remains shut off, coffee is usually extracted with the siphoning action. The hot water released from the hot water outlet 85 is temporarily stored in the receiver 89 below the lid 86. As the volumetric space of the receiver 89 is greater than the volume of each hot water supply (one of hot water supplied intermittently), the air is introduced through the hot water outlet 85 into the hot water reservoir 81 in response to each water supply. Even when hot water from the hot water boiler (not shown) runs to the hot water reservoir 81 faster, the air is taken via the receiver 89 into the hot water reservoir 81. The siphoning action is not interrupted by the spreader 83 but can be repeated for intermittently supplying hot water from the hot water reservoir 81.

Simply dismounting the spreader 83 from the hot water reservoir 81 drains remaining hot water from the hot water reservoir 81 after the brewing of coffee by. The remaining water in the receiver 89 and the water treating unit 88 in the spreader 83 can easily be drained when the spreader 83 has been dismounted.

In this embodiment, not only the remaining water is drained from the hot water reservoir 81, the spreader 83, and the water treating unit 88, but also hot water is supplied stably out intermittently even if the hot water runs into the hot water reservoir 81 at varying speed.

The water treating unit 88 is mounted in the spreader 83 in this embodiment. But the water treating unit 88 may be located on a water tank (not shown), and the spreader 83 may be utilized alone.

(Embodiment 4)

Figure 13:
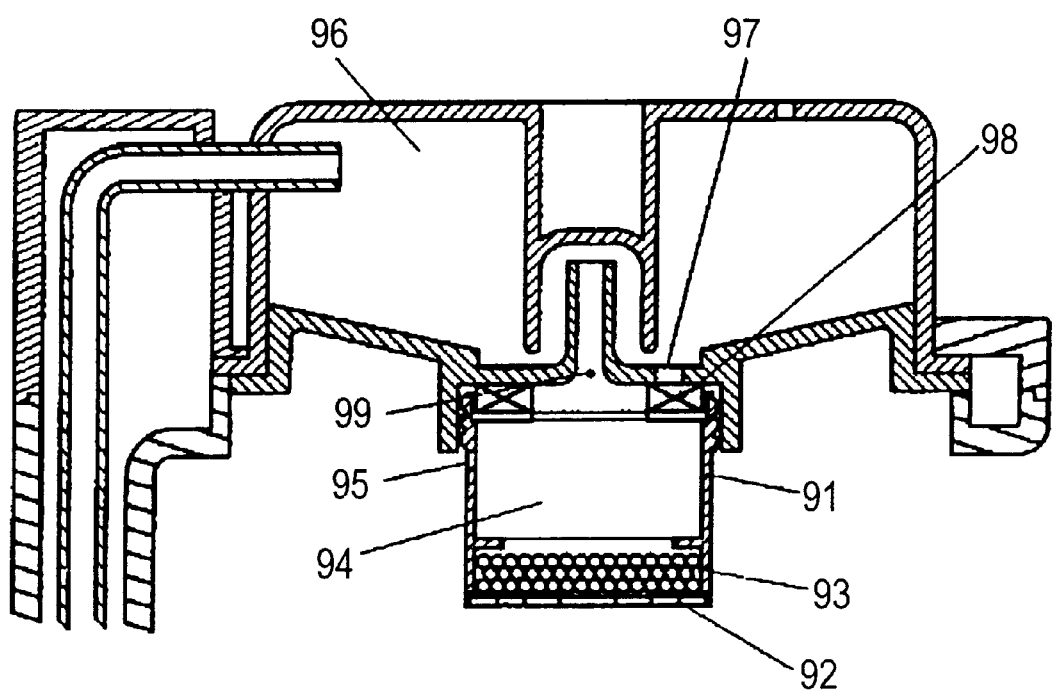
FIG. 13 is a cross sectional view of a primary part of a coffee maker according to Embodiment 4 of the present invention.
Figure 14:
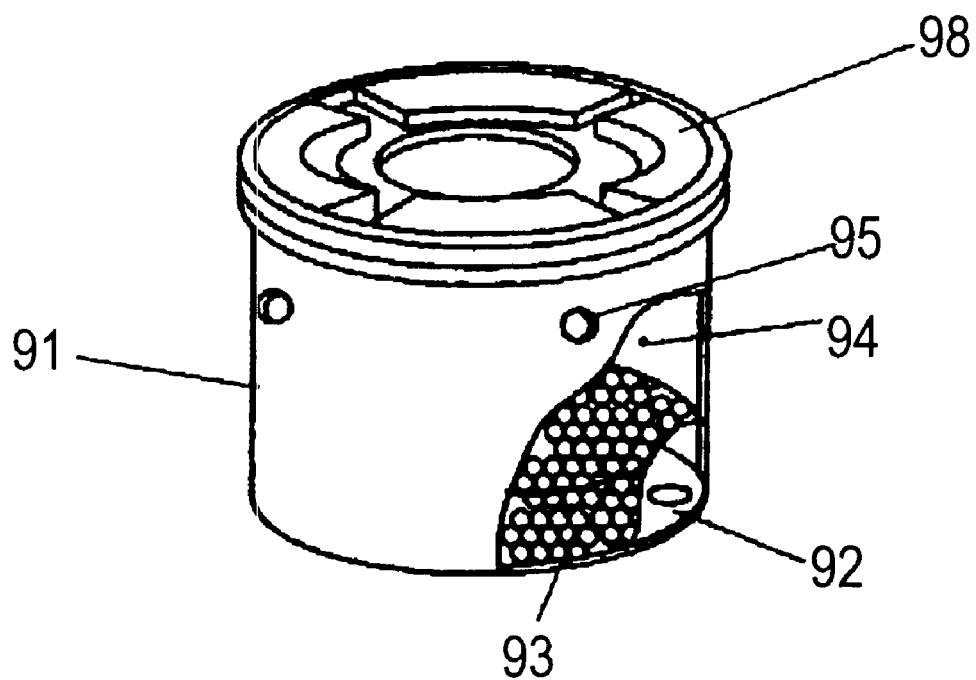
FIG. 14 is a perspective view of a spreader in the coffee maker of Embodiment 4.

FIG. 13 is a cross sectional view of a primary part of a coffee maker according to Embodiment 4 of the present invention. FIG. 14 is a partially cross sectional perspective view of a spreader in the coffee maker.

In this embodiment, a spreader 91 has a perforated spreading plate 92 provided at the bottom thereof, and a water treating unit 93 including active carbon is mounted on the spreading plate 92. A hot water receiver 94 for temporarily storing hot water is provided between the top and the bottom of the spreader 91 with having an air vent 95.

As a bottom opening 97 of a hot water reservoir 96 is closed with an elastic member 98 during the action of brewing coffee, the siphoning action similar to that in Embodiment 3 can be carried out. Also, the hot water released from a hot water outlet 99 is temporarily stored in the receiver 94 of the spreader 91, passed through the water treating unit 93, and then scattered uniformly from the spreading plate 92. After one cycle of the hot water supply is completed, the air is introduced from the air vent 95 into the receiver 94 and then from the hot water outlet 99 into the hot water reservoir 91. When the receiver 94 receives an excessive amount of the hot water greater than the volume of the receiver 94, the air vent 95 functions as a drain hole for discharging the overflow. Accordingly, the volumetric space of the receiver 94 can be sized with less limitation, and thus hot water is supplied intermittently from the hot water reservoir 96 without being interrupted by the spreader 91.

The air vent 95 is located at an upper region of the receiver 94 to ensure both the flow of intake air to the hot water outlet 99 and the supply of hot water to the water treating unit 93.

The water treating unit 91 is mounted in the spreader 91 in this embodiment. But it may be placed at any location in the water feed system including a water tank (not shown), and the spreader 91 may be utilized alone.

According to Embodiments 3 and 4, the siphoning system functions as an intermittent hot water supplying section for releasing hot water from the hot water outlet of the hot water reservoir. The siphoning system may be replaced by a pump or any other appropriate section with the same effect for feeding hot water intermittently.

(Embodiment 5)

Figure 15:
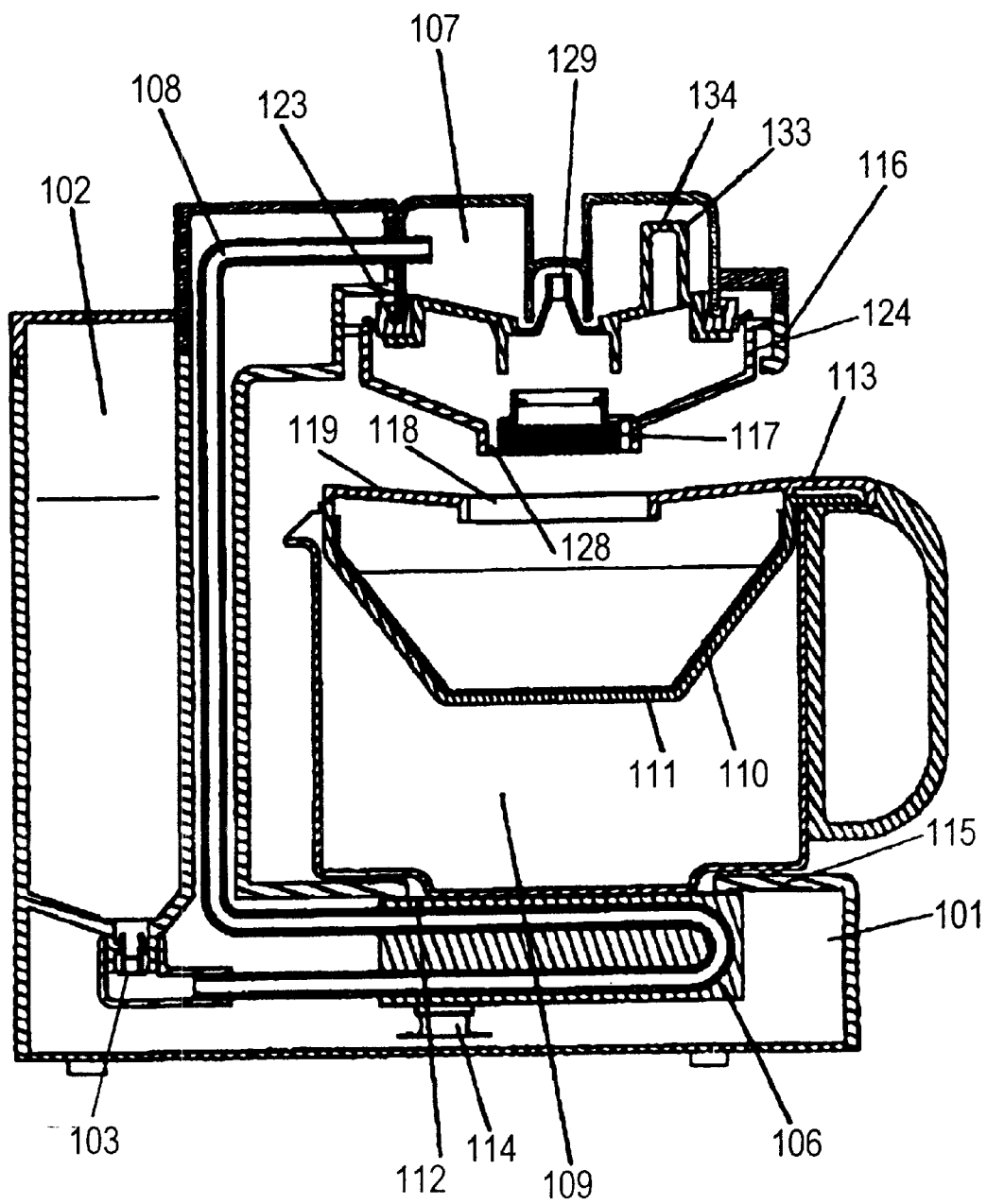
FIG. 15 is a cross sectional view of a primary part of a coffee maker according to Embodiment 5 of the present invention.

FIG. 15 is a cross sectional view of a coffee maker according to Embodiment 5 of the present invention. A main housing 101, a water tank 102, a check valve 103, a power switch 104, an electric heater 105, a hot water boiler 106, a hot water reservoir 107, a hot water conduit 108, a container 109, a paper filter 110, a coffee brewing chamber 111, a keep-warm plate 112, a thermostat 114, and a keep-warm base 115 are identical to those of Embodiment 1 and will be described in no more detail.

A coffee brewing chamber lid 113 is sized enough to cover a mount 116 of the main housing 101 for installing the hot water reservoir 107. Also, the coffee brewing chamber lid 113 has a lid opening 118 provided in the center thereof for passing hot water from the hot water reservoir 107 through a water treating filter 117 to the coffee brewing chamber 111. The coffee brewing chamber lid 113 has a slope section 119 sloping down from the outer edge to the lid opening 118.

Figure 16:
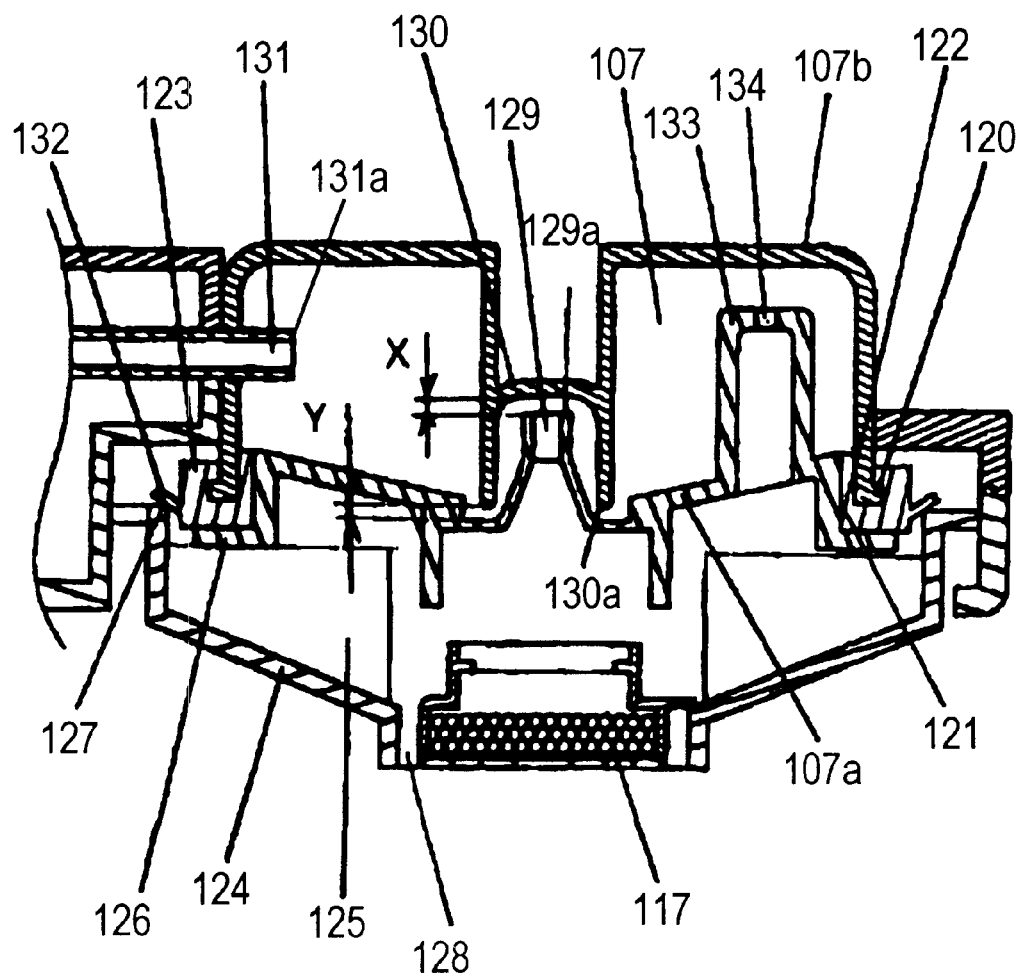
FIG. 16 is a detailed cross sectional view of a hot water reservoir in the coffee maker of Embodiment 5.

FIG. 16 is a detailed cross sectional view of the hot water reservoir 107 of this embodiment.

The hot water reservoir 107 includes a reservoir bottom 107a and a reservoir enclosure 107b between which an elastic member 123 is suspended with a flange portion 120 of the lower end of the reservoir enclosure 107b. The reservoir bottom 107a is joined from below to the reservoir enclosure 107a. Then, the elastic member 123 is held between a wall portion 121 of the reservoir bottom 107a and the inner wall portion 122 of the reservoir enclosure 107b to ensure air tightness as a first scheme of air tightness. When a hot water reservoir cover 124 is joined from below to the main housing 101, ribs 125 press upwardly against the reservoir bottom 107a. And then, the flange portion 120 of the reservoir enclosure 107b and a flange portion 126 of the reservoir bottom 107a deforms the elastic member 123. This performs a second scheme of air tightness in the hot water reservoir 107.

Figure 17:
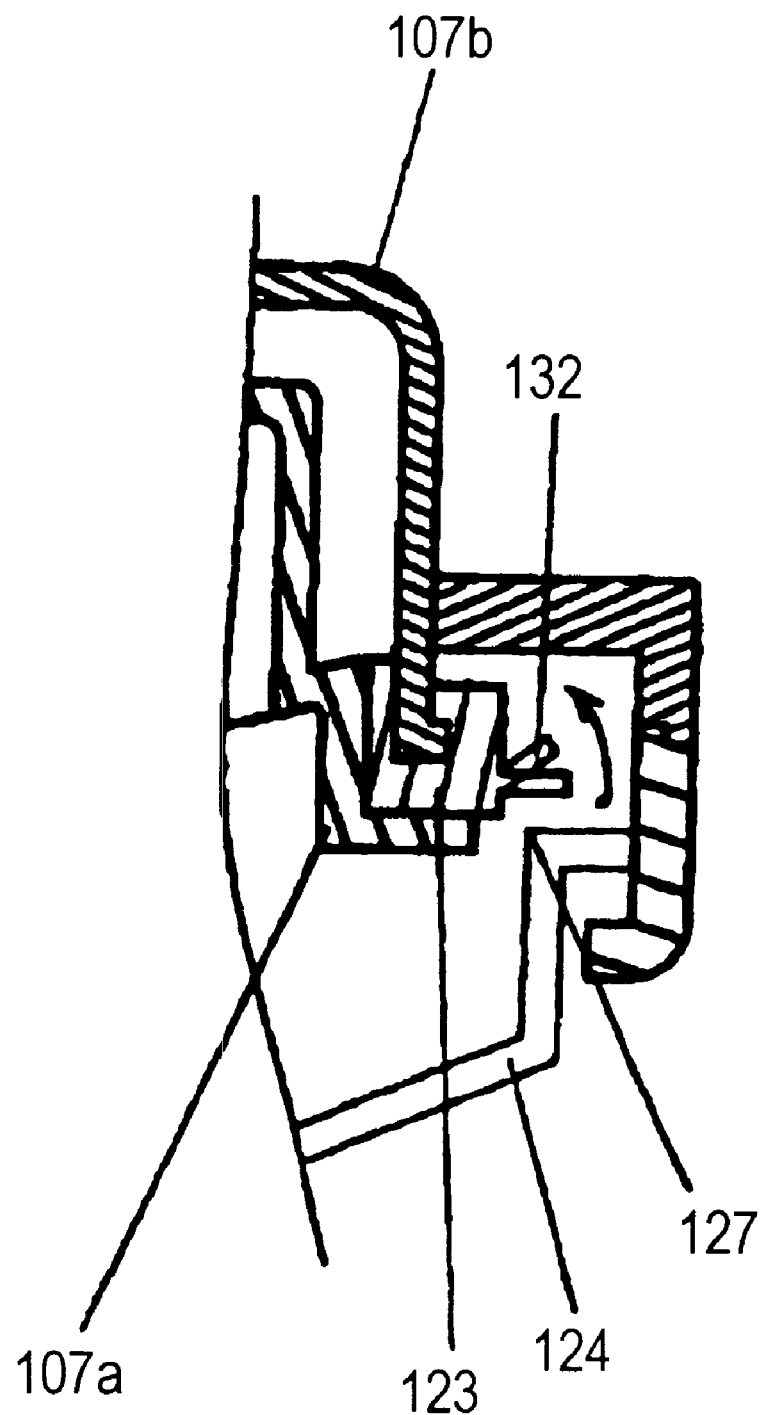
FIG. 17 is a partial cross sectional view of a hot water reservoir cover in its installation in Embodiment 5.

As shown in FIG. 17, the hot water reservoir cover 124 is installed with having an upper side 127 thereof press and deform a flange portion 132 of the elastic member 123.

The cover opening 128 is provided at the bottom of the hot water reservoir cover 124 for installing the water treating filter 117. And the opening 128 is located coaxially and inwardly of the lid opening 118 of the coffee brewing chamber lid 113.

A tube is located on the reservoir bottom 107a of the hot water reservoir 107 substantially at a position corresponding to the center of the reservoir enclosure 107b. The tube forms an intermittent hot water supplying section identical to that of the previous embodiments for supplying hot water intermittently to the coffee brewing chamber 111 by a siphoning action. The tube spreads hot water over the coffee brewing chamber 111.

As described above, the intermittent hot water supplying section includes a tube 129 and a bottomed cap 130 formed unitarily with the reservoir enclosure 107b and spaced by a distance X from the upper opening end 129a of the tube 129. The (distal) lower end 130a of the cap 130 is spaced by a distance Y from the reservoir bottom 107a. The distance Y is substantially equal to or greater than the distance X. A hot water supply pipe 131 joined to the hot water conduit 108 in the hot water reservoir 107 extends with having the outlet 131a located higher than the upper end 129a of the tube 129.

An air vent pipe 133 is provided vertically on the reservoir bottom 107a and has an air vent 134 at the top of the pipe for releasing stream to the outside. The air vent 134 is located higher than the upper end 129a of the tube 129 and the outlet 131a of the supply pipe 131.

That is, the hot water reservoir 107 establishes the following relationship regarding the height:

(Upper End 129a of Tube 129)
≦(Outlet 131a of Hot Water Supply Pipe 131)
≦(Air Vent 134 of Air Vent Pipe 133)

The action of the arrangement of this embodiment will be described.

Figure 18:
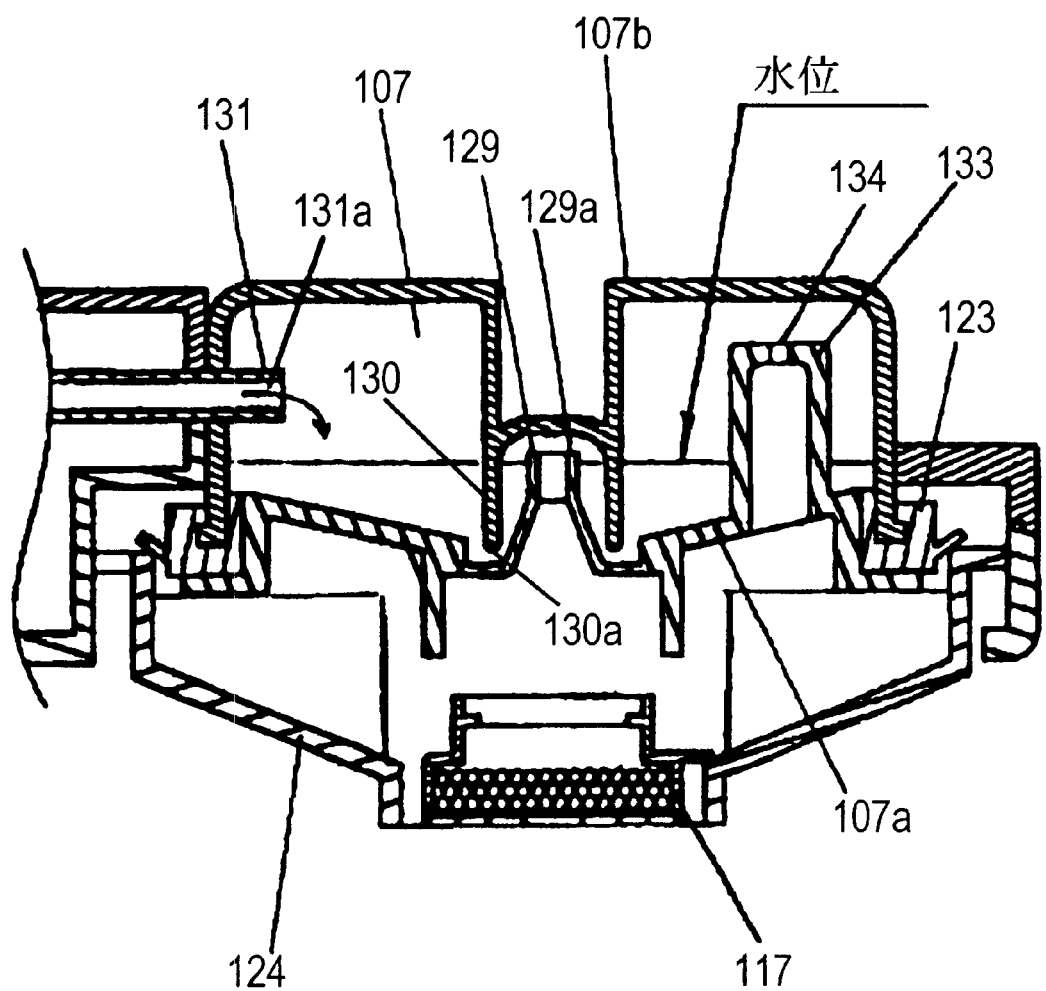
FIG. 18 is a cross sectional view of the hot water reservoir being filled with hot water in Embodiment 5.
Figure 19:
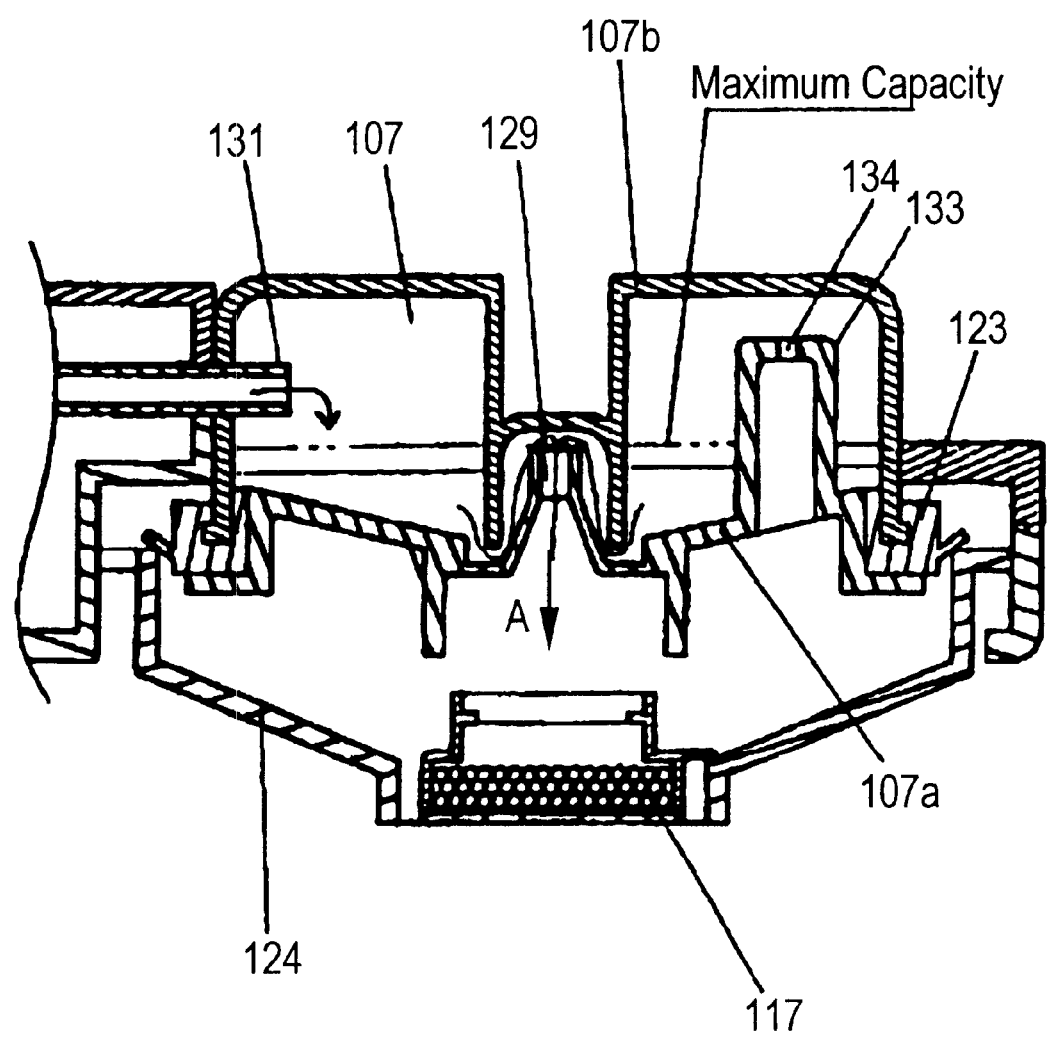
FIG. 19 is a cross sectional view of the hot water reservoir being exhausted in Embodiment 5.
Figure 20:
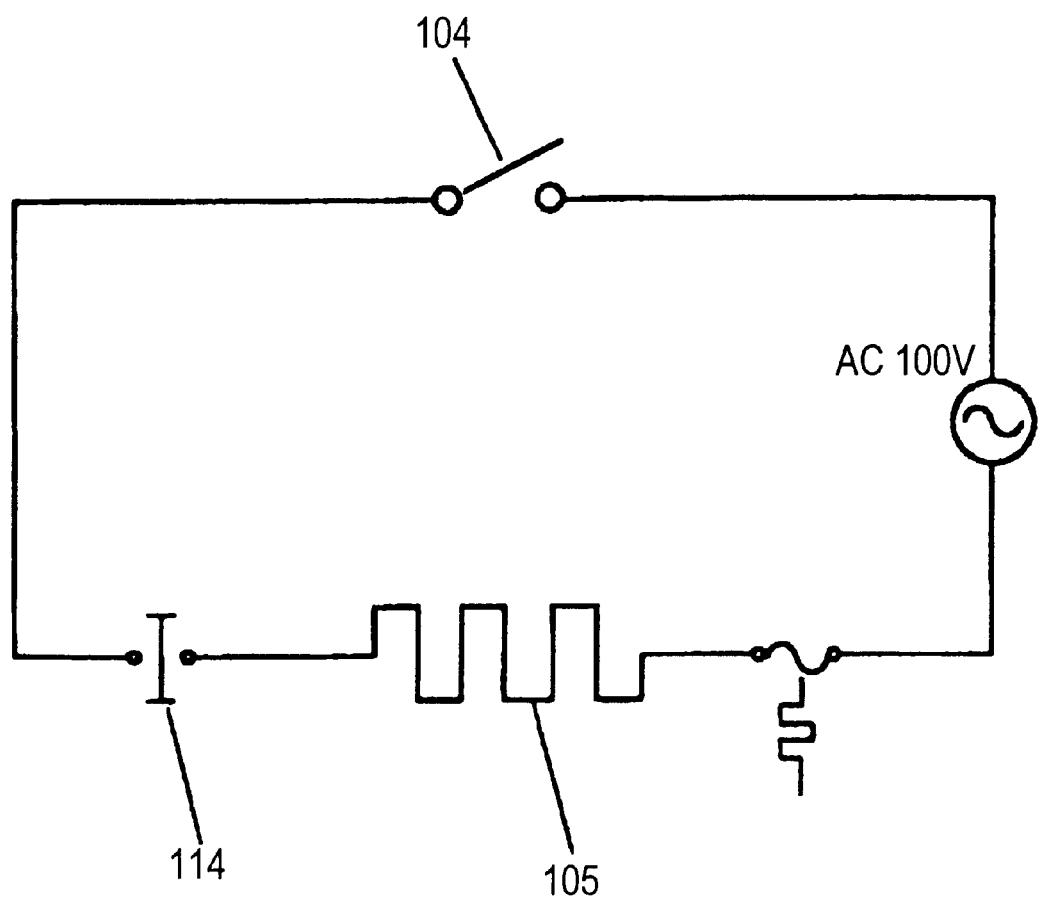
FIG. 20 is a circuit diagram of the coffee maker of Embodiment 5.

With the hot water flowing into the hot water reservoir 107, the inner space between the tube 129 and the cap 130 is filled up in the same manner as of the previous embodiments, as shown in FIG. 18. When exceeding the upper end 129a of the tube 129 (close to the maximum storage capacity of the hot water reservoir 107), the hot water, by the siphoning action, flows in a direction denoted by the arrow A from the hot water reservoir 107 across the tube 129 to the water treating filter 117 as shown in FIG. 19. The hot water passes through the lid opening 118 of the coffee brewing chamber lid 113 and is scattered uniformly over the ground coffee beans in the coffee brewing chamber 111.

The siphoning action starts when the hot water exceeds the upper end 129a of the tube 129 (close to the maximum storage capacity) in the hot water reservoir 107 and allows the hot water to be supplied intermittently to the coffee brewing chamber 111. In the chamber 111, the water steams the ground coffee beans to have coffee flavor extracted easily from the beans. For the second time or later, just filling up the hot water reservoir 107 to the maximum storage capacity with the hot water extracts coffee from the ground coffee beans, which is stirred gently in the coffee brewing chamber 111. Simultaneously, the supply pipe 131 located higher than the upper end 129a of the tube 129 prevents hot water from returning back to the hot water boiler 106.

The air vent 134 of the air vent pipe 133 located higher than the supply pipe 131 prevents the hot water from directly leaking out of the air vent 134 of the air vent pipe 133. The air vent 134 allows the hot water to be supplied from the hot water reservoir 107. The air vent 134 of the air vent pipe 133 located higher than the upper end 129a of the tube 129 prevents the maximum storage capacity in the hot water reservoir 107 from decreasing.

Upon boiling water, the hot water boiler 106 generates steam. The water in the water tank 102 decreases, its head pressure declines to retard supplying water to the hot water boiler 106, and thus, the steam increases. The steam is then released from the air vent 134 of the air vent pipe 133. A portion of the steam flowing from the hot water reservoir 107 is exhausted from the cover opening 128 of the hot water reservoir cover 124. The steam is mostly condensed to water in the space formed by the hot water reservoir cover 124, the reservoir bottom 107a, and the elastic member 123. Accordingly, the steam to the outside decreases. The condensed water drops down from the cover opening 128 of the hot water reservoir cover 124. As the cover opening 128 is located coaxially and inwardly of the lid opening 118 of the coffee brewing chamber lid 113, the condensed water is received by the coffee brewing chamber 111.

When humidity is high, the steam passing through the cover opening 128 of the hot water reservoir cover 124 may be condensed on the lower side of the mount 116 of the hot water reservoir 107 of the main housing 101 or on the outer side of the hot water reservoir cover 124. The coffee brewing chamber lid 113 is large enough to cover the mount 116 of the hot water reservoir 107. Therefore, the condensed water drops down on the coffee brewing chamber lid 113 and runs along the slope side 119 to the lid opening 118 before it is received by the coffee brewing chamber 111.

As the steam is released downwardly, its pressure can easily be controlled. Directing the steam downwardly prevents the condensed water from leaking out from the main housing 101.

The hot water boiler 106 operates until the thermostat 114 operates. The thermostat 114, upon operating, temporarily cancels to energize the electric heater 105. The thermostat 114 operating automatically keeps the brewed coffee received by the container 109 placed on the keep-warm base 115 warm. This continues until the power switch 104 is finally turned off.

When the temperature in the hot water reservoir 107 drops down after the power switch 104 is turned off, the condensed water is stored in the hot water reservoir 107. According to this embodiment, the water condensed around the tube 129 on the reservoir bottom 107a can simply be taken out by turning counter-clockwise and dismounting the hot water reservoir cover 124 from the main housing 101.

The elastic member 123, for being secured by the flange portion 120 of the reservoir enclosure 107b, may hardly be lost when being dismounted.

(Embodiment 6)

Figure 21:
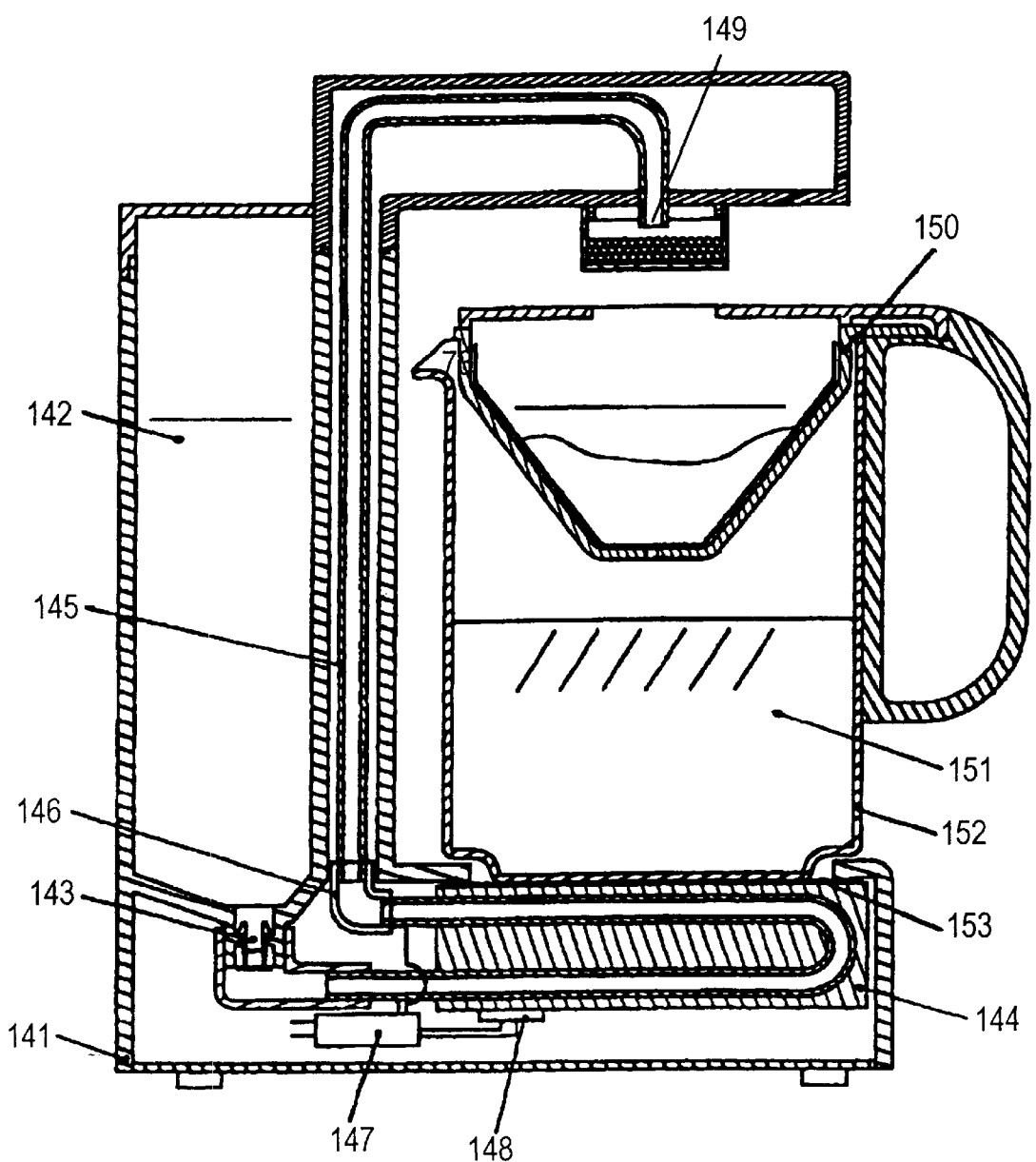
FIG. 21 is a cross sectional view of a coffee maker according to Embodiment 6 of the present invention.
Figure 22:
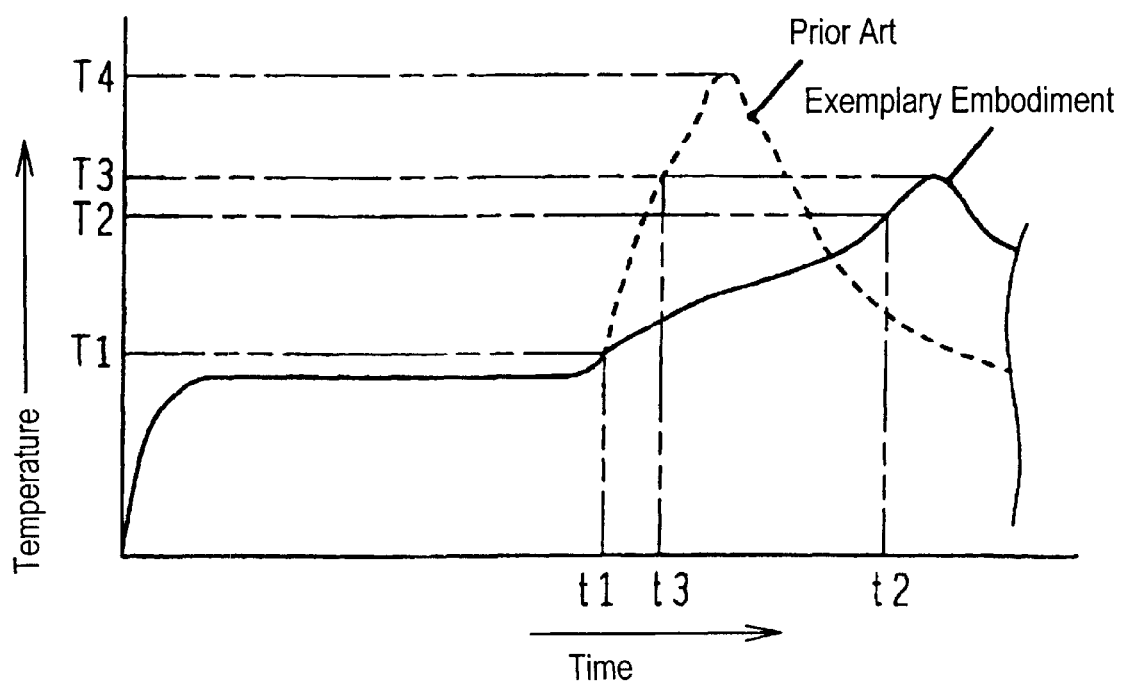
FIG. 22 is a graphic diagram showing a profile of the temperature change with time of a heating section during the brewing action of the coffee maker of Embodiment 6.

FIG. 21 is a cross sectional view of a coffee maker according to Embodiment 6 of the present invention. FIG. 22 is a diagram showing a profile of the temperature change with time of a heating device measured by a temperature sensor in the coffee maker.

As shown in FIG. 21, a main housing 141, a water tank 142, a check valve 143, the heating device 144 such as an electric heater, and a pump-up conduit 145 are identical to those shown in the previous embodiments. The heating device 144 and the pump-up conduit 145 are communicated to each other by a connector tube 146 made of e.g. silicon rubber. A heater controller 147 controls energizing the heating device 144. The controller 144 is electrically connected with the temperature sensor 148 engaged directly with a portion of the heating device 144. The pump-up conduit 145 has a spreading outlet 149 provided at the distal end thereof. The outlet 149 is located directly above a coffee brewing basket 150 (a coffee brewing chamber) in this embodiment. Beneath the basket 150, a glass container 152 is placed on a keep-warm plate 153 or the heating device 144 for receiving brewed coffee 151.

In the arrangement, hot water heated by the heating device 144 runs upwardly in the pump-up conduit 145 due to the pressure of steam, and poured from the spreading outlet 149 over the ground coffee beans in the basket 150. As a result, the brewed coffee 151 from the basket 150 is received and stored in the container 152.

As shown in FIG. 22, as the water in the tank 142 decreases, the temperature of the heating device 144 increases. When the temperature sensor 148 detects that a set temperature T1, the heater controller 147 reduces a power to the heating device 144 for lowering the heating. As time passes, the tank 142 and the pump-up conduit 145 are finally drained, and the heating device 144 soars up the temperature. When the temperature sensor 148 detects that the temperature exceeds a set temperature T2, the heater controller 147 cancels the power to the heating device 144 at a time t2. After that, the temperatures of the heating device 144 and the pump-up conduit 145 increase moderately as an overshoot up to a temperature T3. Finally, as being cooled down with a room temperature, they have the temperature drop down.

However, in the prior art, the positional energy of a reduced mount of water remaining in the tank 142 is too low to force the water into the heating device 144 as resisting against the pressure of steam. As being heated up by the heating device 144, a small amount of water almost turns to steam thus increasing the steam pressure in the heating device 144. The harder the water is fed from the tank 142 into the heating device 144, the higher the temperature of the heating device 144 increases, thus promoting a cyclic action of generating and releasing the steam.

According to this embodiment, as the heating temperature of the heating device 144 is declined, the pressure of steam in the heating device 144 is inhibited from increasing excessively. This permits the water in the tank 142 to be smoothly fed into the heating device 144 where the steam turns to hot water. As the hot water runs into the pump-up conduit 145, the steam is prevented from releasing.

According to the prior art, the temperature of the heating device 144 sharply increases up to a temperature T3 when the tank 142 is almost exhausted. Even when the heating device 144 is deenergized at a time t3 at the temperature T3, the temperature remains increasing for a while and overshoots to T4.

According to this embodiment, the heating device 144 is favorably controlled to lower the output when the temperature rises up to a temperature T1 at the initial stage of increase in response to almost exhausting the tank 142. This allows the temperature of the heating device 144 to continue to rise moderately to a temperature T2 for a duration from a time t1 to a time t2. As a result, the temperature overshoots to a low temperature T3. Accordingly, the connector tube 146 made of e.g. silicon rubber can be protected from being degraded or deformed due to an excessively-high temperature.

As being energized for the duration from the time t1 to the time t2 which is longer than the duration from the time t1 to a time t3, the heating device 144 can generously heat up the container 152 with the brewed coffee 151 which is placed on its keep-warm plate 153. As a result, the brewed coffee 151 can be kept warm.

Figure 23:
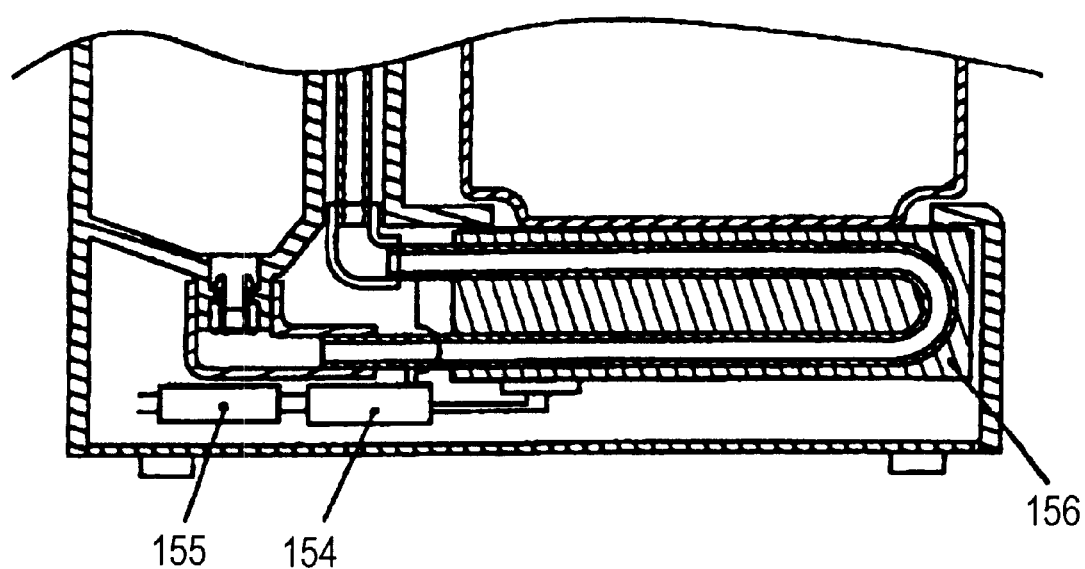
FIG. 23 is a cross sectional view of a primary part of the coffee maker of Embodiment 6.

In this embodiment, the heater controller 147 controls only to decrease the output of the heating device 144. The controller may increase a duty calculating section 155 as shown in FIG. 23. A duty of the energization calculated by the duty ratio calculating section 155 of the heater controller 154 is used for controlling a heating section 156. In this case, the duty may be changed as desired. The duty can arbitrarily be varied to have a desired pattern of the brewing action and to modify the brewing conditions and the period of energization after the brewing action.

(Embodiment 7)

Figure 24:
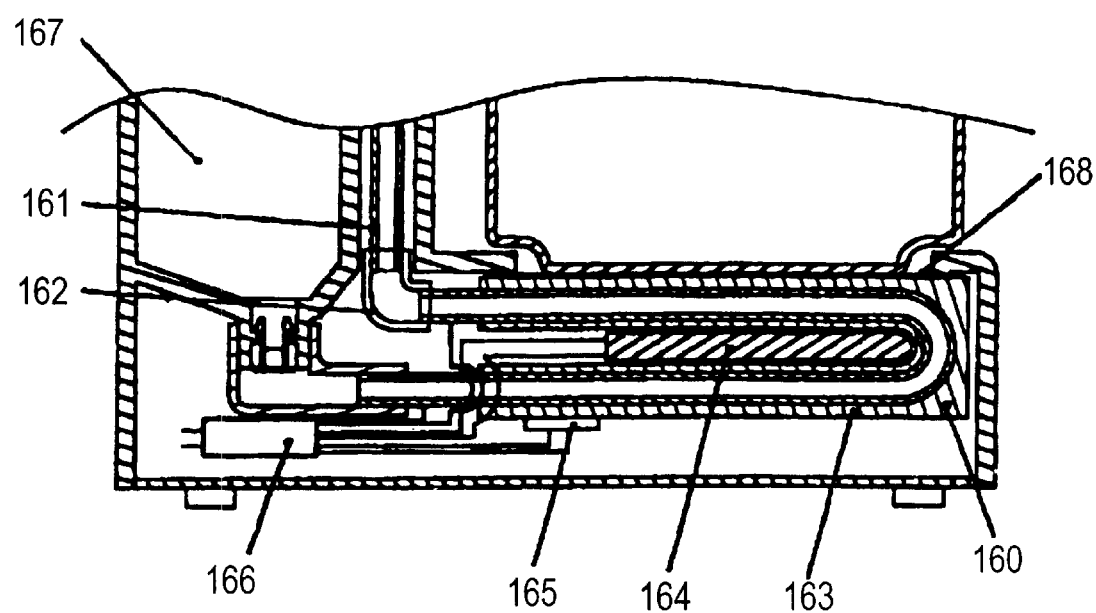
FIG. 24 is a cross sectional view of a primary part of a coffee maker according to Embodiment 7 of the present invention.
Figure 25:
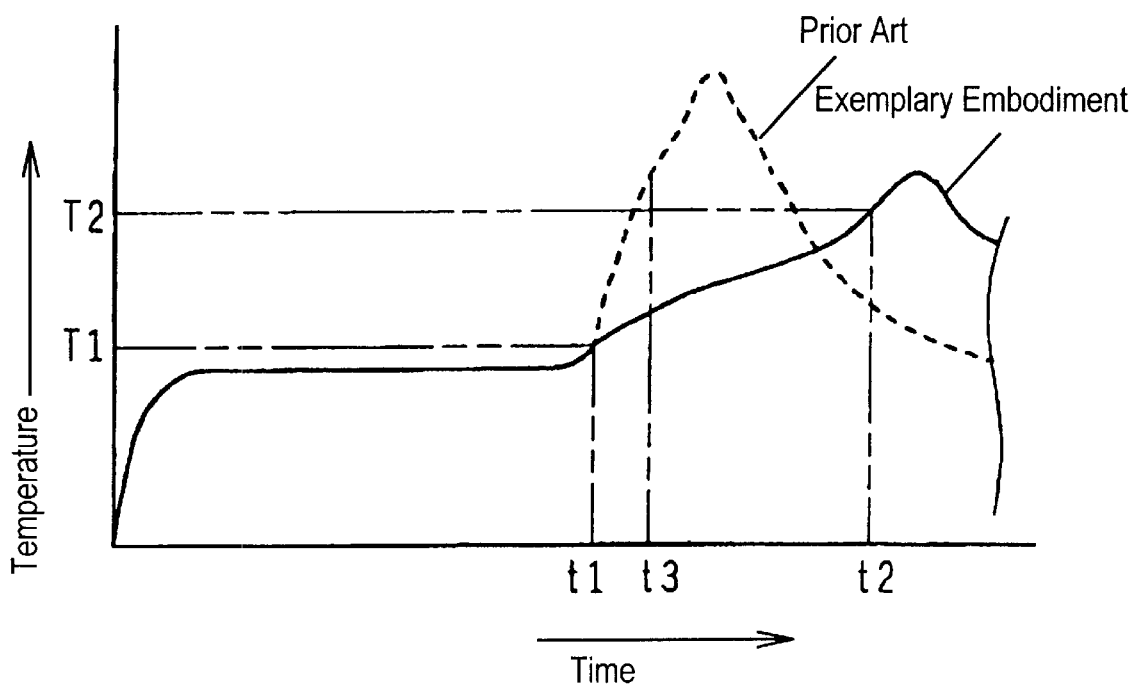
FIG. 25 is a graphic diagram showing a profile of the temperature change with time of a heating device during the brewing action of the coffee maker of Embodiment 7.

FIG. 24 is a cross sectional view of a primary part of a coffee maker according to Embodiment 7 of the present invention. FIG. 25 is a graphic diagram showing a profile of the temperature change with time of a heating device.

In this embodiment, the heating device 160 includes a main heater 163 and a sub heater 164 located in the same region both connected with a connector tube 162 to a water feed system including a pump-up conduit 161. The device also includes a temperature sensor 165 and a heater controller 166.

When the water stored in a water tank 167 is almost exhausted nearly at the end of a brewing action and as the positional energy declines, the water is hardly carried into the heating device 160 due to the pressure of steam in the main heater 163. This causes the temperature of the heating device 160 to soar up to a temperature T1 shown in FIG. 25. Then, the temperature sensor 165 generates and delivers a signal to the heater controller 166 for canceling to energize the sub heater 164 located in the same region as of the main heater 163. As a result, the output of the heating device 160 declines. As the steam pressure in the main heater 163 is inhibited from increasing excessively, the water in the tank 167 can smoothly flow into the main heater 164. Accordingly, while the hot water is forced into a pump-up conduit 161, the release of steam is reduced.

This protects the connector tube 162 from being degraded by high temperature, similarly to Embodiment 6. This permits the main heater 163 to heat up the brewed coffee on its keep-warm plate 168 for a period from a time t1 to a time t2 which is extended from a period up to a time t3 in the prior art shown in FIG. 25.

For increasing the output of the heating device 160 in the brewing, a combination of the main heater 163 and the sub heater 164 each of which has a smaller heating capability than a single type of the heating device 160. Hence, the overall load of the heating section will be reduced.

In this embodiment, the output of the heating device 160 declines by canceling to energize the sub heater 164 while energizing the main heater 163 upon detecting the set temperature T1. Alternatively, this may be achieved by canceling the main heater 163.

(Embodiment 8)

Figure 26:
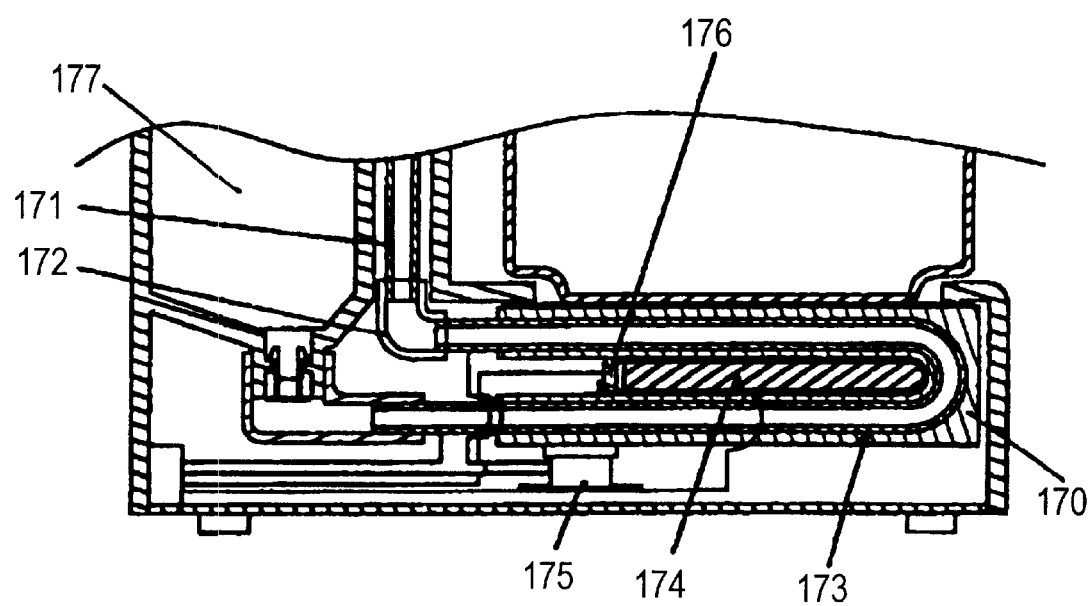
FIG. 26 is a cross sectional view of a primary part of a coffee maker according to Embodiment 8 of the present invention.

FIG. 26 is a cross sectional view of a primary part of a coffee maker according to Embodiment 8 of the present invention. FIG. 25 shows a profile of the temperature change with time of a heating device measured by a temperature sensor in this embodiment.

In this embodiment, the heating device 170 includes a main heater 173 and a sub heater 174 located in the same region and connected with a connector to a water feed system including a pump-up conduit 171. Also a couple of thermostats 175 and 176 operates as a temperature sensor/energization controller are connected.

The thermostat 176 starts to operate at a set temperature T1 (FIG. 25), at which a water tank 177 is almost exhausted, and the temperature of the heating device 170 increases. The thermostat 174 starts to operate at a set temperature T2 at which the tank 177 and the pump-up conduit 171 are exhausted.

When the water stored in a water tank 177 is almost exhausted and has the positional energy declined nearly at the end of a brewing action, the water is hardly carried into the heating device 170 due to the pressure of steam in the main heater 173. Then, the thermostat 176 for the sub heater 174 located in the same region as of the main heater 173 cancels to energize the sub heater 174. As a result, the output of the heating device 170 declines. As the steam pressure in the main heater 173 is inhibited from increasing excessively, the water in the tank 177 can smoothly flow into the main heater 173. Accordingly, while the hot water is forced into a pump-up conduit 171, the release of steam will be reduced.

This device provides the same effect as of Embodiment 6 as well as the device permits the controlling action to be performed by an inexpensive, simple arrangement of the thermostats 175 and 176 without using a known control circuit.

While a set temperature T2 of the thermostat 175 for controlling the main heater 173 is determined higher than the set temperature T1 of the thermostat 176 for controlling the sub heater 174, the temperatures may be reversed.

(Embodiment 9)

Figure 27:
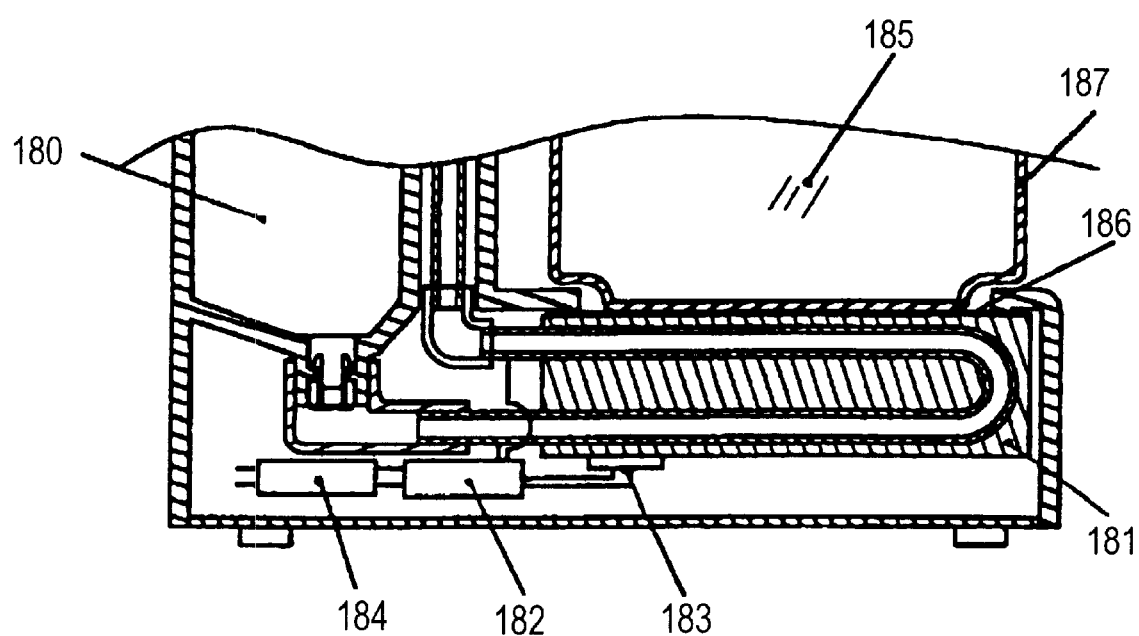
FIG. 27 is a cross sectional view of a primary part of a coffee maker according to Embodiment 9 of the present invention.

FIG. 27 is a cross sectional view of a primary part of a coffee maker according to Embodiment 9 of the present invention. FIG. 25 shows a profile of the temperature change with time of a heating device measured by a temperature sensor in this embodiment.

The maker in this embodiment includes a heater controller 182 for controlling to energize a heating device 181 for a water tank 180, a temperature sensor 183 engaged directly with the heating device 181 or a water conduit, and a timer 184 electrically connected to one another. A container 187 containing brewed coffee 185 is placed on a keep-warm plate 186 which is a portion of the heating device 181.

When the water tank 180 is almost exhausted, and when the temperature of the heating device 181 increases up to a set temperature T1, the heater controller 182 declines the output of the heating device 181 and simultaneously the timer 184 starts counting time. When the timer 184 counts a set duration t2, energizing the heating device 181 is canceled. Controlling the duration of the energization controls the warming time for heating the keep-warm plate 186, thus controlling the temperature of the brewed coffee 185. For instance, the brewed coffee 185 at the end of the brewing action may has a temperature kept at a higher temperature. Also, the heating device 181 can decline the output thereof controllably to maintain the temperature of the brewed coffee 185 at a desired temperature.

(Embodiment 10)

Figure 28:
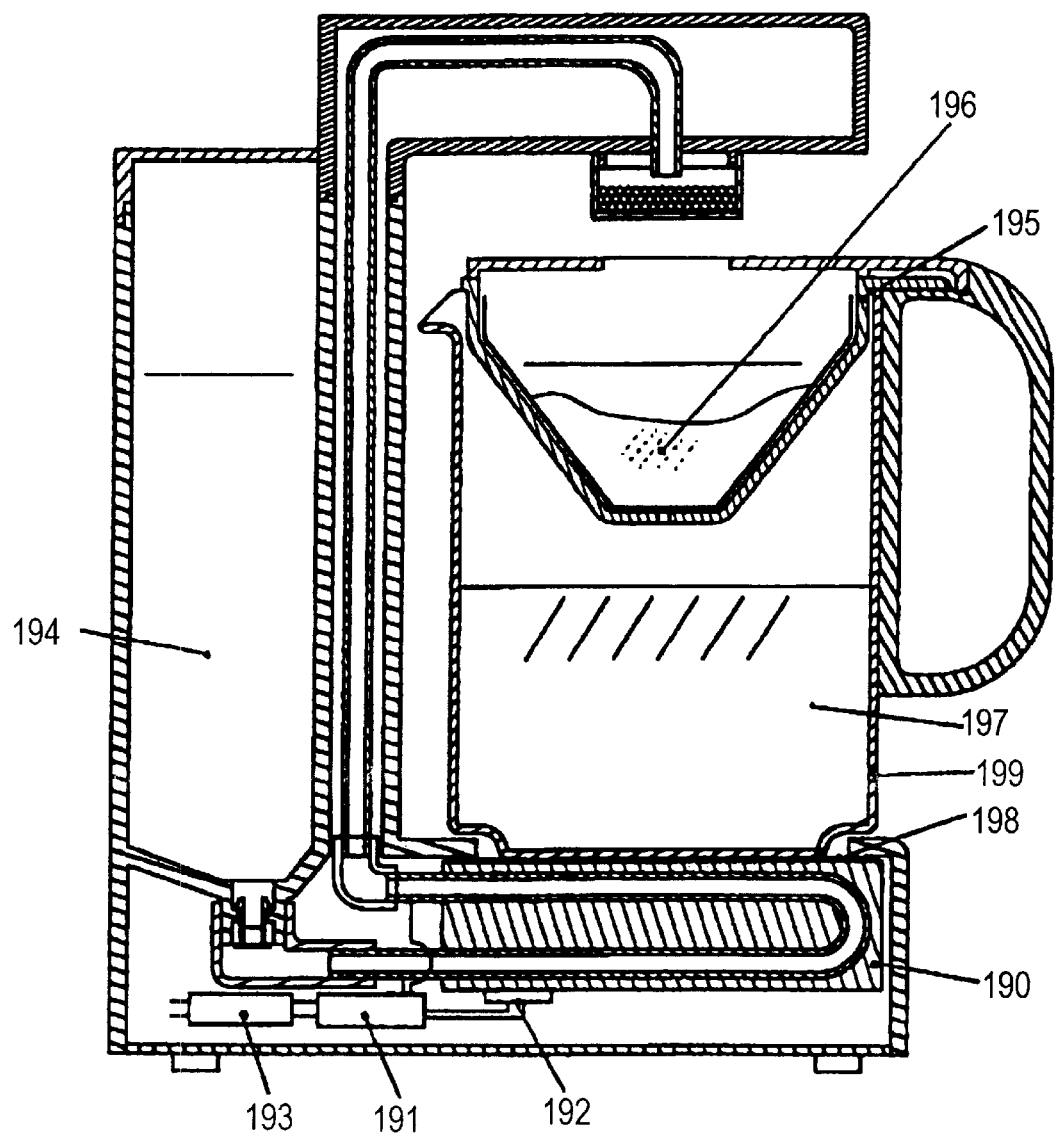
FIG. 28 is a cross sectional view of a coffee maker according to Embodiment 10 of the present invention.
Figure 29:
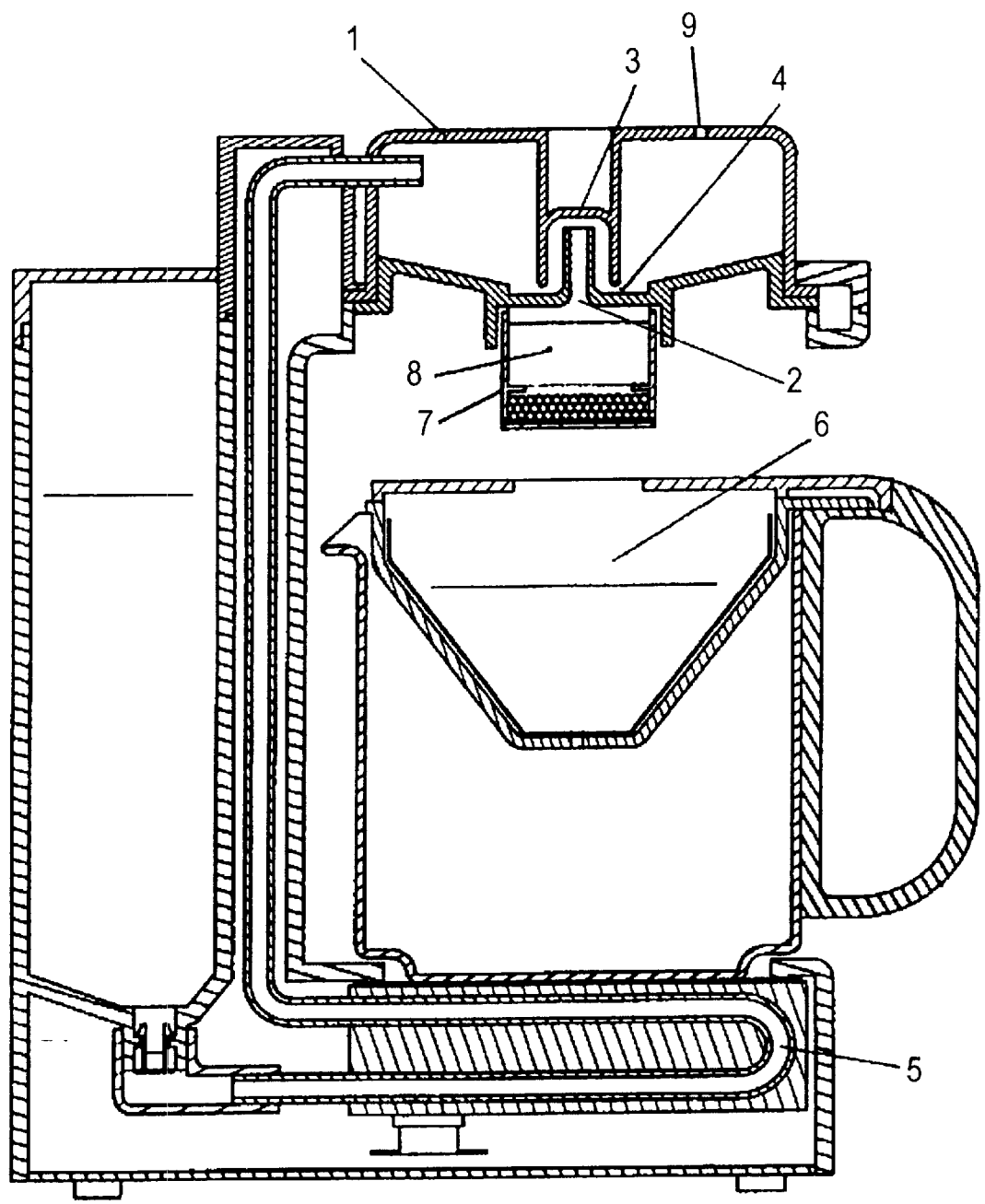
FIG. 29 is a cross sectional view of a conventional intermittently-drip-type coffee maker with intermittent hot water delivery.
Figure 30:
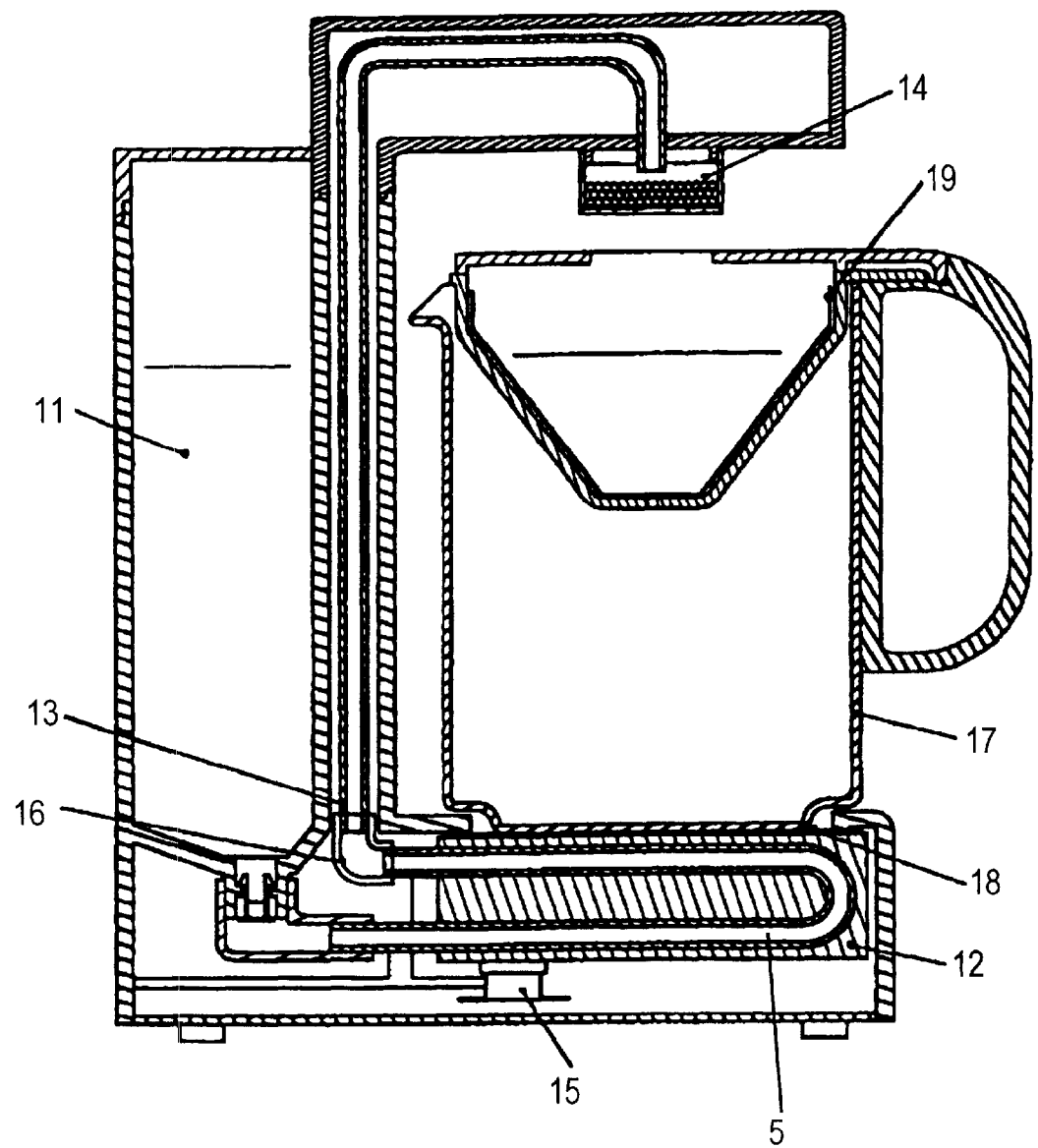
FIG. 30 is a cross sectional view of a conventional drip-type coffee maker.

FIG. 28 is a cross sectional view of a primary part of a coffee maker according to Embodiment 10 of the present invention. A profile of the temperature change with time of a heating device measured by a temperature sensor in this embodiment may also be anticipated from FIG. 25.

In this embodiment, a heater controller 191 for controlling to energize a heating device 190, a temperature sensor 192 engaged directly with the heating device 190, and a notifying section 193 for notifying the end of energization are electrically connected to one another. The water in a water tank 194 is passed through the heating device 190 and poured over ground coffee beans 196 in a basket 195. Resultant brewed coffee 197 is received by a container 199 placed on a keep-warm plate 198 which is a portion of the heating device 190.

When the tank 194 is almost exhausted and has the temperature thereof increase up to a set temperature T1 which is then detected by the temperature sensor 192, the heating controller 191 declines the output of the heating device 190. Then, when the temperature sensor 192 detects that the temperature reaches a temperature T2 at a time t2, the heating controller 191 cancels to energize the heating device 190.

After a time t1 at the set temperature T1, the water from the tank 194 gradually turns to hot water and then is poured over the ground coffee beans 196 in the basket 195. As a result, the brewed coffee 197 is slowly dripped from the basket 195. In the prior art, the hot water remains in the basket 195 at a time t3 at which the energization is canceled, and thus the end of the brewing action is not notified. In this embodiment, the output of the heating device 190 is controlled by the heating controller 191, so that the time t2 determined by the set temperature T2 may become nearly the same as a time for the actual brewing in the basket 195. Thereby, the end of the energization can be notified by the notifying section 193 with a buzzer sound or lamp illumination.

As set forth above, according to the present invention, the coffee maker includes the tube provided on the bottom of the hot water reservoir for feeding the hot water into the coffee brewing chamber and the cap arranged over and spaced from the tube by a distance smaller than the inner diameter of the tube. The hot water and the air can be alternated with each other at an upper or uppermost region of the tube. As a result, the hot water is intermittently supplied stably.

According to the present invention, the hot water reservoir has a structure which can be easily separated into two, an upper segment and a lower segment having a bottom opening. Remaining of water after the brewing action can be removed much easily.

According to the present invention, the detecting device detects whether the hot water reservoir is mounted to the main housing or not. The device controls to energize the hot water boiler. This inhibits the hot water from being splashed out due to a fault handling of the hot water reservoir.

According to the present invention, the hot water supply pipe releases the hot water downwardly in the hot water reservoir, and the heat radiation inhibiting cover is provided for covering entirely the hot water reservoir. This inhibits the temperature of the hot water fed to the coffee brewing chamber from decreasing.

According to the present invention, the air vent is provided for exhausting from the lower side of the hot water reservoir. This inhibits the steam from blowing out of the upper side in all directions.

According to the present invention, the output of the heating device is controlled in response to an increase of the temperature of the heating device itself or water feed system. This inhibits the connector tube from being excessively heated up and permits the output of the heating device to remain optimum for the brewing of coffee.

What is claimed is:

1. A coffee maker comprising:
    a hot water generator;
    a hot water reservoir which receives hot water from the hot water generator;
    a coffee brewing chamber;
    a tube provided on a bottom portion of the hot water reservoir for delivering hot water to the coffee brewing chamber; and
    a cap provided over the tube in the hot water reservoir with being spaced by a specific distance x from the tube, wherein the distance x is not greater than an inner diameter of an opening of the tube for developing a siphoning action to deliver hot water intermittently to the coffee brewing chamber.

2. The coffee maker according to claim 1,
    wherein a distance between a distal end of the cap and a base of the tube is greater than a distance between an outer side of the tube and a corresponding side of the cap located outside of the tube, and is greater than the distance x, and
    wherein the corresponding side of the cap located above the opening of the tube is continuously curved in each corner.

3. The coffee maker according to claim 2, wherein an upper end at the opening of the tube is rounded or beveled.

4. The coffee maker according to claim 2, wherein the distal end of the cap is rounded at both outer and inner sides.

5. The coffee maker according to claim 1, wherein the opening of the tube becomes gradually wider in the cross section in a direction towards the coffee brewing chamber.

6. The coffee make according to claim 5,
    wherein the hot water reservoir comprises:
        a reservoir bottom having a wall provided on an outer edge thereof;
        a reservoir enclosure for covering over the reservoir bottom; and
        an elastic member mounted to the outer edge of the reservoir bottom for sealing between the reservoir bottom and the reservoir enclosure, and
    wherein the reservoir bottom and reservoir enclosure are detachably joined to each other.

7. The coffee maker according to claim 6, further comprising:
    a main housing for holding the hot water generator, the hot water reservoir, the coffee brewing chamber, the tube, and the cap; and
    a detecting device for detecting whether or not at least one of the reservoir bottom and reservoir enclosure is installed to the main housing,
wherein energizing the hot water generator is controlled according to a signal from the detecting device.

8. The coffee maker according to claim 6, further comprising a heat radiation inhibiting cover for covering the hot water reservoir.

9. The coffee maker according to claim 1,
    wherein the hot water reservoir comprises:
        a reservoir bottom having a wall provided on an outer edge thereof;
        a reservoir enclosure for covering over the reservoir bottom; and
        an elastic member mounted to the outer edge of the reservoir bottom for sealing between the reservoir bottom and the reservoir enclosure, and
    wherein the reservoir bottom and the reservoir enclosure are detachably joined to each other.

10. The coffee maker according to claim 9, further comprising a heat radiation inhibiting cover for covering the hot water reservoir.

11. The coffee maker according to claim 9, further comprising a detecting device for detecting whether or not at least one of the reservoir bottom and the reservoir enclosure is installed to the main housing, wherein energizing the hot water generator is controlled according to a signal from the detecting device.

12. The coffee maker according to claim 1, further comprising a hot water supply pipe formed unitarily with the hot water reservoir for feeding hot water generated by the hot water generator into the hot water reservoir,
    wherein an outlet of the hot water supply pipe is located higher than the opening of the tube for delivering the hot water to the coffee brewing chamber, and
    wherein the outlet of the hot water supply pipe is open downwardly.

13. A coffee maker comprising:
    a hot water generator including a plurality of heating devices;
    a heater controller being operable to control energizing of the heating devices;
    a hot water reservoir;
    a coffee brewing chamber;
    a tube provided for delivering the hot water to a bottom of the hot water reservoir and the coffee brewing chamber; and
    a cap provided over the tube, being spaced from the tube by a specific distance in the hot water reservoir,
    wherein the distance between the cap and the tube is not greater than an inner diameter of the opening of the tube to develop a siphoning action for delivering the hot water intermittently to the coffee brewing chamber, and
    wherein the heater controller is operable to control a number of the heating devices to be energized.

14. The coffee maker according to claim 13, wherein the heater controller includes a thermostat which is operable to control an energization of the heating devices.

15. The coffee maker according to claim 14, further comprising a notifying means for notifying an end of the energization when the energization of the heating devices is canceled.

16. The coffee maker according to claim 13, further comprising a timer for counting a duration during brewing coffee, wherein energizing the heating devices is canceled when the timer counts a specific duration.

17. The coffee maker according to claim 13, further comprising a notifying means for notifying an end of an energization when energizing the heating devices is canceled.

* * * * *